United States Patent
Raval

(10) Patent No.: US 12,276,833 B2
(45) Date of Patent: Apr. 15, 2025

(54) MULTI-STRIP-LOADED OPTICAL WAVEGUIDE

(71) Applicant: Ayar Labs, Inc., Santa Clara, CA (US)

(72) Inventor: Manan Raval, Oakland, CA (US)

(73) Assignee: Ayar Labs, Inc., San Jose, CA (US)

( * ) Notice: Subject to any disclaimer, the term of this patent is extended or adjusted under 35 U.S.C. 154(b) by 213 days.

(21) Appl. No.: 18/186,189

(22) Filed: Mar. 19, 2023

(65) Prior Publication Data
US 2023/0296837 A1  Sep. 21, 2023

Related U.S. Application Data

(60) Provisional application No. 63/321,764, filed on Mar. 20, 2022.

(51) Int. Cl.
  *G02B 6/122*    (2006.01)
  *G02B 6/132*    (2006.01)
(52) U.S. Cl.
  CPC ........... *G02B 6/1223* (2013.01); *G02B 6/132* (2013.01)
(58) Field of Classification Search
  None
  See application file for complete search history.

(56) References Cited

U.S. PATENT DOCUMENTS

| | | |
|---|---|---|
| 6,834,152 B2 | 12/2004 | Gunn et al. |
| 7,046,896 B1 | 5/2006 | Gunn et al. |
| 9,893,219 B2 | 2/2018 | Suzuki et al. |
| 10,444,593 B2 | 10/2019 | Mekis et al. |
| 2009/0060411 A1* | 3/2009 | Levy ............ G02F 1/0955 |
| | | 359/280 |

OTHER PUBLICATIONS

PCT Application No. PCT/US2023/015592, International Search Report and Written Opinion, Mailed on Aug. 10, 2023, 17 pages.

* cited by examiner

*Primary Examiner* — Chad H Smith
(74) *Attorney, Agent, or Firm* — Penilla IP, APC

(57) ABSTRACT

A strip-loaded optical waveguide includes a slab layer, a strip layer, and a cladding region. The slab layer has a first optical refractive index and a first width measured in a transverse direction that is perpendicular to a light propagation direction through the strip-loaded optical waveguide. The strip layer is disposed above the slab layer. The strip layer has a second optical refractive index and a second width as measured the transverse direction. The second width is less than the first width of the slab layer. The second optical refractive index is less than the first optical refractive index of the slab layer. The cladding region is disposed above the slab layer and above the strip layer. The cladding region has a third optical refractive index that is less than the second optical refractive index of the strip layer.

26 Claims, 13 Drawing Sheets

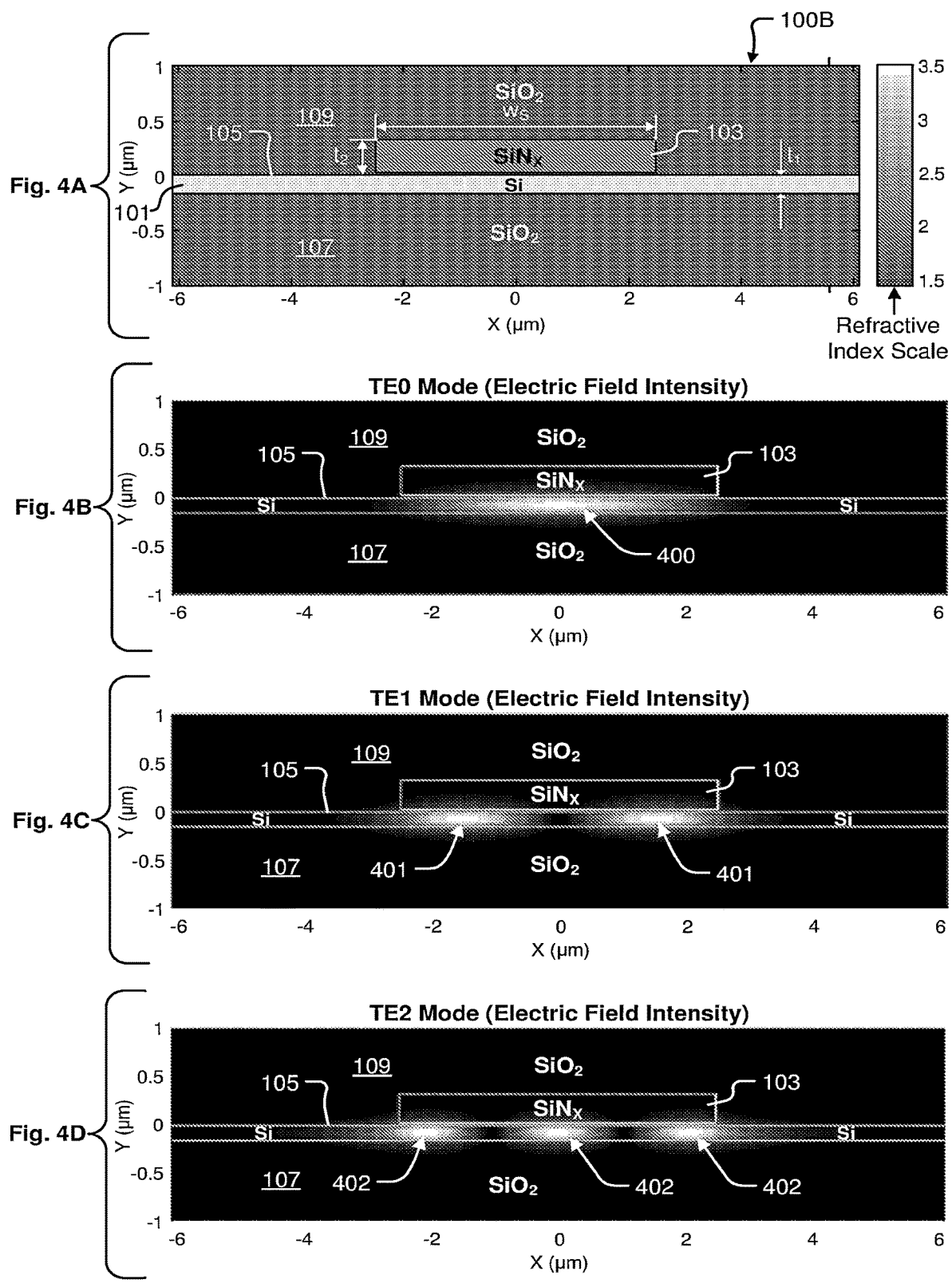

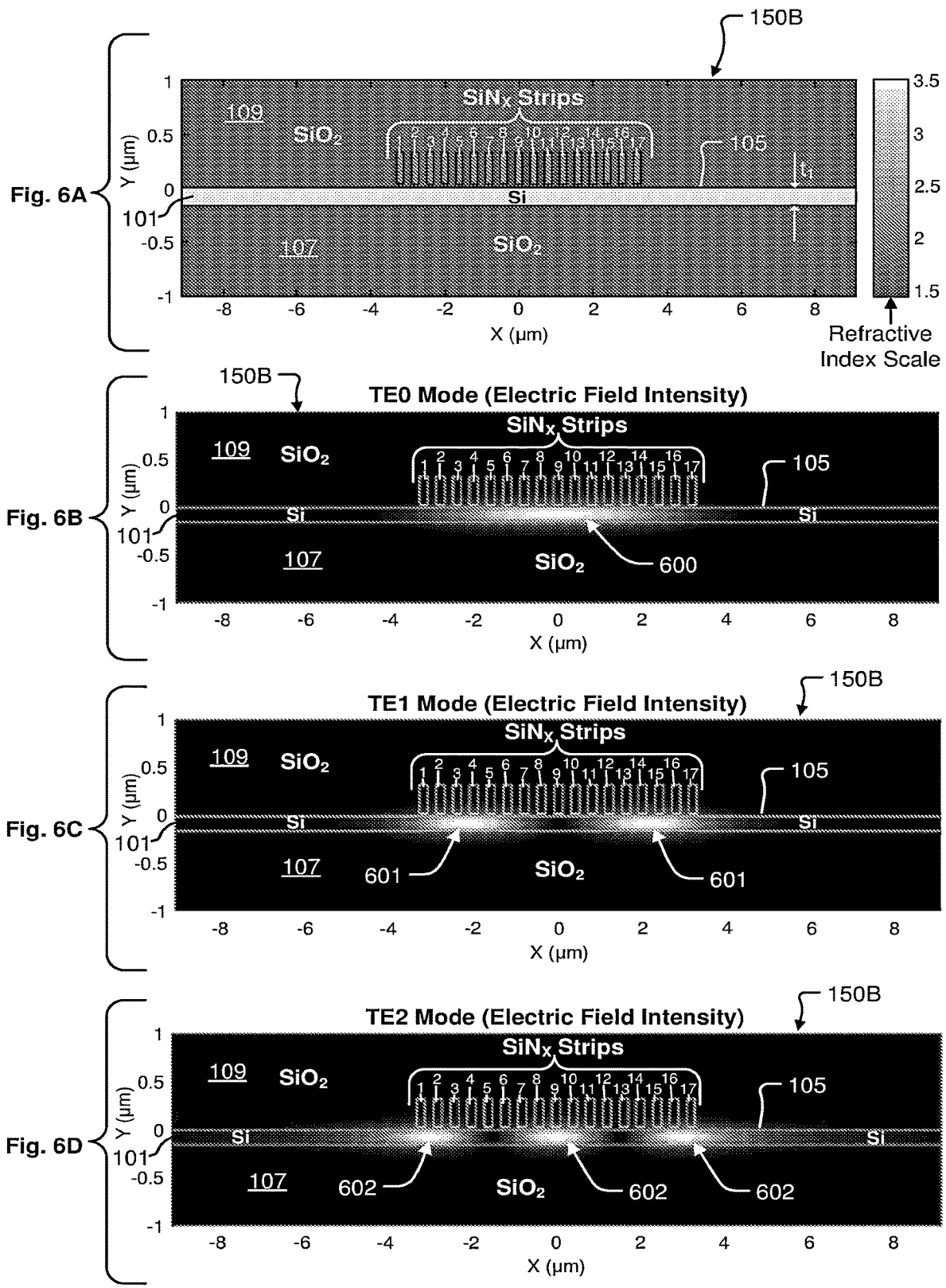

(View A-A)

(View B-B)

(View A-A)

(View B-B)

┌─ 1001

Dispose the strip layer over the slab layer, where the strip layer has the width ($w_s$) measured in the transverse direction (x-direction) that is perpendicular to the light propagation direction (z-direction) through the optical waveguide, and where the slab layer has a width measured in the transverse direction (x-direction), such that the width ($w_s$) of the strip layer is less than the width of the slab layer, and where the strip layer has the optical refractive index ($n_2$) that is less than the optical refractive index ($n_1$) of the slab layer, and where the width ($w_s$) of the strip layer is set to maximize a size of a $0^{th}$ order optical mode within the slab layer below the strip layer without substantially exciting a higher order optical mode relative to the $0^{th}$ order optical mode.

┌─ 1003

Dispose the cladding layer over both the slab layer and the strip layer, where the cladding layer has the optical refractive index ($n_4$) that is less than the optical refractive index ($n_2$) of the strip layer.

Dispose the plurality of strips over the slab layer, where each of the plurality of strips has the strip width measured in the transverse direction (x-direction) that is perpendicular to the light propagation direction (z-direction) through the multi-strip-loaded optical waveguide, and where adjacently positioned ones of the plurality of strips are spaced apart from each other by the strip-to-strip distance as measured in the transverse direction (x-direction), and where each of the plurality of strips has the optical refractive index ($n_2$) that is less than the optical refractive index ($n_1$) of the slab layer, and where the total distance across the plurality of strips in the transverse direction (x-direction) is less than the width of the slab layer as measured in the transverse direction (x-direction), and where the total distance across the plurality of strips in the transverse direction (x-direction) is set to maximize a size of a $0^{th}$ order optical mode within the slab layer below the plurality of strips without exciting a higher order optical mode relative to the $0^{th}$ order optical mode.

┌─ 1103

Dispose the cladding layer over the slab layer, over the plurality of strips, and between adjacently positioned ones of the plurality of strips, where the cladding layer has the optical refractive index ($n_4$) that is less than the optical refractive index ($n_2$) of the plurality of strips.

Fig. 11

MULTI-STRIP-LOADED OPTICAL WAVEGUIDE

CROSS-REFERENCE TO RELATED APPLICATIONS

This claims priority under 35 U.S.C. 119(e) to U.S. Provisional Patent Application No. 63/321,764, filed on Mar. 20, 2022, the disclosure of which is incorporated herein by reference in its entirety for all purposes.

BACKGROUND OF THE INVENTION

Optical data communication systems operate by modulating laser light to encode digital data patterns. The modulated laser light is transmitted through an optical data network from a sending node to a receiving node. The modulated laser light having arrived at the receiving node is de-modulated to obtain the original digital data patterns. Therefore, implementation and operation of optical data communication systems is dependent upon having reliable and efficient optical waveguides for guiding propagating light signals. It is within this context that the present disclosed embodiments arise.

SUMMARY OF THE INVENTION

In an example embodiment, a strip-loaded optical waveguide is disclosed. The strip-loaded optical waveguide includes a slab layer that has a first optical refractive index and a first width measured in a transverse direction that is perpendicular to a light propagation direction through the strip-loaded optical waveguide. The strip-loaded optical waveguide also includes a strip layer disposed above the slab layer. The strip layer has a second optical refractive index and a second width as measured in the transverse direction. The second width is less than the first width of the slab layer. The second optical refractive index is less than the first optical refractive index of the slab layer. The strip-loaded optical waveguide also includes a cladding region disposed above the slab layer and above the strip layer. The cladding region has a third optical refractive index that is less than the second optical refractive index of the strip layer.

In an example embodiment, a method is disclosed for manufacturing an optical waveguide. The method includes disposing a strip layer over a slab layer. The strip layer has a width measured in a transverse direction that is perpendicular to a light propagation direction through the optical waveguide. The slab layer has a width measured in the transverse direction. The width of the strip layer is less than the width of the slab layer. The strip layer has an optical refractive index that is less than an optical refractive index of the slab layer. The width of the strip layer is set to maximize a size of a $0^{th}$ order optical mode within the slab layer below the strip layer without exciting a higher order optical mode relative to the $0^{th}$ order optical mode. The method also includes disposing a cladding layer over both the slab layer and the strip layer. The cladding layer has an optical refractive index that is less than the optical refractive index of the strip layer.

In an example embodiment, a multi-strip-loaded optical waveguide is disclosed. The multi-strip-loaded optical waveguide includes a slab layer that has a first optical refractive index and a first width measured in a transverse direction that is perpendicular to a light propagation direction through the multi-strip-loaded optical waveguide. The multi-strip-loaded optical waveguide also includes a plurality of strips disposed within a strip layer above the slab layer. Each of the plurality of strips has a strip width measured in the transverse direction. Adjacently positioned ones of the plurality of strips are spaced apart from each other by a strip-to-strip distance as measured in the transverse direction. Each of the plurality of strips has a second optical refractive index that is less than the first optical refractive index of the slab layer. A total distance across the plurality of strips in the transverse direction is less than the first width of the slab layer. The multi-strip-loaded optical waveguide also includes a cladding region disposed above the slab layer, above the plurality of strips, and between adjacently positioned ones of the plurality of strips. The cladding region has a third optical refractive index that is less than the second optical refractive index of the plurality of strips.

In an example embodiment, a method is disclosed for manufacturing an optical waveguide. The method includes disposing a plurality of strips over a slab layer. Each of the plurality of strips has a strip width measured in a transverse direction that is perpendicular to a light propagation direction through the optical waveguide. Adjacently positioned ones of the plurality of strips are spaced apart from each other by a strip-to-strip distance as measured in the transverse direction. Each of the plurality of strips has a second optical refractive index that is less than a first optical refractive index of the slab layer. A total distance across the plurality of strips in the transverse direction is less than a width of the slab layer as measured in the transverse direction. The total distance across the plurality of strips in the transverse direction is set to maximize a size of a $0^{th}$ order optical mode within the slab layer below the plurality of strips without exciting a higher order optical mode relative to the $0^{th}$ order optical mode. The method also includes disposing a cladding layer over the slab layer, over the plurality of strips, and between adjacently positioned ones of the plurality of strips. The cladding layer has an optical refractive index that is less than the optical refractive index of the plurality of strips.

BRIEF DESCRIPTION OF THE DRAWINGS

FIG. 4A shows a vertical cross-section view of a strip-loaded optical waveguide manufactured within a CMOS platform, in accordance with some embodiments.

FIG. 4B shows a simulated quasi-TE0 optical mode of light propagating through the strip-loaded optical waveguide of FIG. 4A, in accordance with some embodiments.

FIG. 4C shows a simulated quasi-TE1 optical mode of light propagating through the strip-loaded optical waveguide of FIG. 4A, in accordance with some embodiments.

FIG. 4D shows a simulated quasi-TE2 optical mode of light propagating through the strip-loaded optical waveguide of FIG. 4A, in accordance with some embodiments.

FIG. 6A shows a vertical cross-section view of a multi-strip-loaded optical waveguide manufactured within a CMOS platform, in accordance with some embodiments.

FIG. 6B shows a simulated quasi-TE0 optical mode of light propagating through the multi-strip-loaded optical waveguide, in accordance with some embodiments.

FIG. 6C shows a simulated quasi-TE1 optical mode of light propagating through the multi-strip-loaded optical waveguide, in accordance with some embodiments.

FIG. 6D shows a simulated quasi-TE2 optical mode of light propagating through the multi-strip-loaded optical waveguide, in accordance with some embodiments.

FIG. 10 shows a flowchart of a method for manufacturing the strip-loaded optical waveguide, in accordance with some embodiments.

FIG. 11 shows a flowchart of a method for manufacturing the multi-strip-loaded optical waveguide, in accordance with some embodiments.

DETAILED DESCRIPTION OF THE INVENTION

Figure 1A:
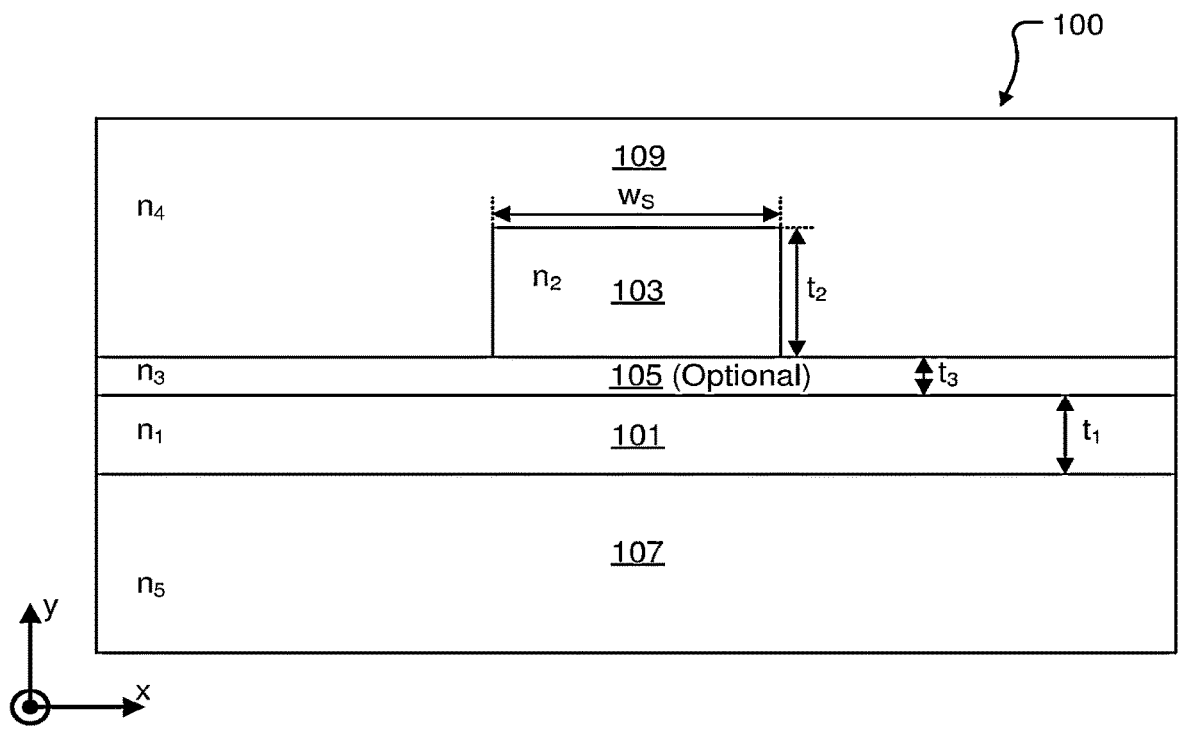
FIG. 1A shows a vertical cross-section view of a strip-loaded optical waveguide manufactured within a CMOS platform, in accordance with some embodiments.

In the following description, numerous specific details are set forth in order to provide an understanding of the embodiments disclosed herein. It will be apparent, however, to one skilled in the art that the embodiments disclosed herein may be practiced without some or all of these specific details. In other instances, well known process operations have not been described in detail in order not to unnecessarily obscure the disclosed embodiments.

Various embodiments disclosed herein relate to optical data communication. Integrated photonic platforms have become increasingly attractive for a wide range of applications, such as sensing and optical data communications, which benefit from having multiple optical functionalities implemented on a single chip. In particular, silicon photonic platforms have emerged as a key technology because they allow for implementing both electrical and optical functionalities on a single substrate that can be manufactured using existing and mature complementary metal-oxide-semiconductor (CMOS) fabrication processes. Silicon photonics also allows for integrated optical waveguides with high refractive index contrast, which in turn enables tight bending radii and compact optical system footprints.

One drawback of using silicon as an optical waveguiding material is multi-photon absorption, which results in an increase in optical propagation loss at high optical powers. Two-photon absorption (TPA) in particular is present in the telecommunication optical data communication wavelength bands. At high optical intensities, TPA results in optical absorption within the optical waveguiding material and correspondingly generates free carriers (electrons or holes that are free to move and correspondingly carry charge) within the optical waveguiding material, which in turn cause both a change in the refractive index of the optical waveguiding material due to free carrier dispersion (FCD) and additional optical absorption due to free carrier absorption (FCA) within the optical waveguiding material. Since TPA responds to optical intensity, this effect can be mitigated by increasing the size of the optical waveguide such that the peak optical intensity of the propagating mode of light is lower for a given optical power. However, a larger optical waveguide typically supports high order modes of propagating light. Excitation of these higher order modes can result in undesired optical loss and optical interference effects in the optical waveguide. Various embodiments are disclosed herein for using a strip-loaded optical waveguide, in which a strip of CMOS-compatible material is deposited above a silicon slab, to provide optical guiding of light in the lateral direction. The quasi transverse electric (TE) optical modes of propagating light supported by this strip-loaded optical waveguide have significantly larger mode areas than a strip optical waveguide that supports the same number of optical modes of propagating light.

In silicon photonic platforms, optical waveguides and components suffer from increased optical losses at high optical powers due to TPA and FCA. TPA is a nonlinear absorption phenomenon which increases with optical field intensity. TPA is especially problematic in a single mode strip optical waveguide or in a rib optical waveguide, which are frequently used for routing optical signals. Additionally, TPA can also cause increased power-dependent optical loss in components which support multiple optical modes of propagating light, such as in directional optical couplers or multimode optical interferometers.

In some applications, the optical waveguide width may be increased in order to increase the optical mode area and decrease the optical intensity of the optical mode, which in turn decreases TPA. However, the increase in the width of the optical waveguide results in the optical waveguide supporting additional optical modes that are not used to carry the optical signal. Any of the propagating light that is scattered into these additional optical modes may interfere with the optical signal somewhere downstream in the optical system and produce undesired artifacts in the optical transmission spectrum.

Various embodiments are disclosed herein for an optical waveguide configured to include a silicon, germanium, or silicon-germanium alloy slab layer and an overlying dielectric strip used as a lateral optical guiding mechanism. The above-mentioned optical waveguide configuration is referred to as a strip-loaded optical waveguide. In comparison to the optical modes in a strip or rib optical waveguide that supports a specific number of optical modes, the optical modes in the strip-loaded optical waveguide that supports the same number of optical modes (as in the strip or rib optical waveguide) may have significantly larger optical mode areas, thereby reducing the impact of TPA at high optical powers.

FIG. 1A shows a vertical cross-section view of a strip-loaded optical waveguide 100 manufactured within a CMOS platform, in accordance with some embodiments. The strip-loaded optical waveguide 100 includes a slab layer 101 having an optical refractive index $n_1$ and a vertical thickness $t_1$. In various embodiments, the slab layer 101 is formed of silicon, germanium, or silicon-germanium alloy, among other materials. In some embodiments, the slab layer 101 is undoped. In other embodiments, the slab layer 101 is doped. The strip-loaded optical waveguide 100 also includes a strip layer 103 having an optical refractive index $n_2$, a vertical thickness $t_2$ as measured in the y-direction, and a width $w_s$ as measured in the x-direction. In some embodiments, the strip layer 103 is formed of a dielectric material that is compatible with CMOS fabrication processes. In some embodiments, the optical refractive index $n_2$ of the strip layer 103 is less than the optical refractive index $n_1$ of the slab layer 101. For example, in some embodiments, the strip layer 103 is formed of silicon nitride ($SiN_x$). However, in some embodiments, the strip layer 103 is formed of another CMOS-compatible dielectric material, such as silicon oxynitride (SiON) or aluminum nitride (AlN), among other materials. The width of the slab layer 101, as measured in the x-direction, is substantially larger than the optical mode or optical modes of the propagating light guided by the strip layer 103.

In some embodiments, the strip-loaded optical waveguide 100 includes an intermediate layer 105 disposed between the slab layer 101 and the strip layer 103. The intermediate layer 105 has an optical refractive index $n_3$ and a vertical thickness $t_3$ as measured in the y-direction. The optical refractive index $n_3$ of the intermediate layer 105 is less than or equal to the optical refractive index $n_1$ of the slab layer 101. In various embodiments, the intermediate layer 105 is formed of a CMOS-compatible dielectric material. In some embodiments of the strip-loaded optical waveguide 100, the intermediate layer 105 is not present, i.e., $t_3$ is equal to zero.

The strip-loaded optical waveguide 100 is positioned on top of an underlying insulator layer 107 having an optical refractive index $n_5$ that is less than the optical refractive index $n_1$ of the slab layer 101. In some embodiments, the underlying insulator layer 107 is formed of silicon oxide. In some embodiments, the underlying insulator layer 107 is formed of silicon dioxide ($SiO_2$). However, in some embodiments, the underlying insulator layer 107 is formed of another CMOS-compatible insulator material, such as aluminum oxide, among others. Also, a cladding region 109 is formed across a top of the strip-loaded optical waveguide 100. The cladding region 109 has an optical refractive index $n_4$ that is greater than one and less than the optical refractive index $n_2$ of the strip layer 103, i.e., $1<n_4<n_2$. In some embodiments, the cladding region 109 is formed of silicon oxide ($SiO_x$). In some embodiments, the cladding region 109 is formed of silicon dioxide ($SiO_2$).

The strip layer 103 provides a locally increased effective optical refractive index in the x-direction, which provides for optical waveguiding. In the vertical direction (y-direction), optical waveguiding and optical confinement are provided by the optical refractive index contrast between the slab layer 101 and the neighboring insulator layer(s) or dielectric layer(s), e.g., neighboring portions of the strip layer 103, the intermediate layer 105 (when present), the underlying insulator layer 107, and the cladding region 109. For a given combination of slab layer 101 thickness $t_1$ and strip layer 103 thickness $t_2$, the width $w_s$ of the strip layer 103 is defined to support either a single quasi-TE mode or multiple quasi-TE modes for the light propagating through the strip-loaded optical waveguide 100.

Figure 1B:
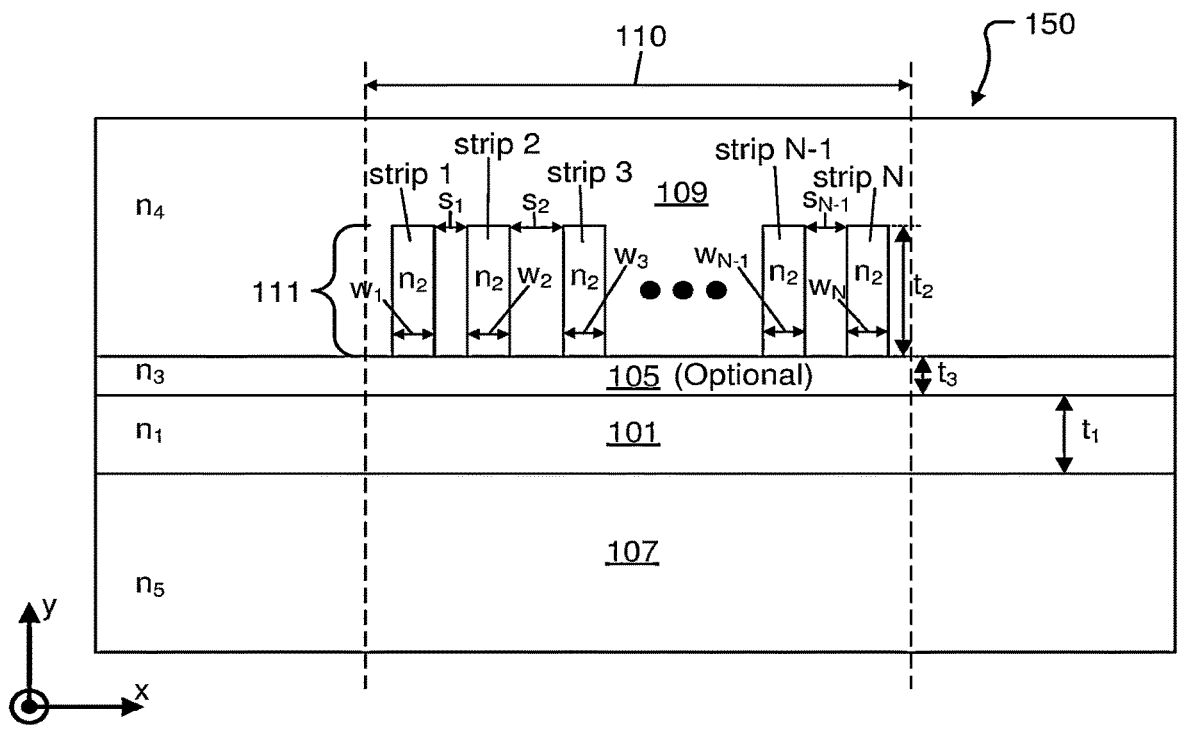
FIG. 1B shows a vertical cross-section view of a multi-strip-loaded optical waveguide manufactured within a CMOS platform, in accordance with some embodiments.

FIG. 1B shows a vertical cross-section view of a multi-strip-loaded optical waveguide 150 manufactured within a CMOS platform, in accordance with some embodiments. The multi-strip-loaded optical waveguide 150 is configured similar to the strip-loaded optical waveguide 100 of FIG. 1A, with the exception that the strip layer 103 of the strip-loaded optical waveguide 100 is replaced by a multiple strip layer 111. The multiple strip layer 111 includes a number (N) of strips (strip 1 through strip N, where N is greater than 1), which define a propagating light guiding region 110 that has an increased effective optical refractive index in the x-direction. The N strips (strip 1 through strip N) are arranged in an array configuration within the multiple strip layer 111. Each of the N strips (strip 1 through strip N) has the optical refractive index $n_2$. In some embodiments, the each of the N strips (strip 1 through strip N) is formed of a dielectric material that is compatible with CMOS fabrication processes. For example, in some embodiments, each of the N strips (strip 1 through strip N) is formed of silicon nitride ($SiN_x$). However, in some embodiments, each of the N strips (strip 1 through strip N) is formed of another CMOS-compatible dielectric material, such as silicon oxynitride (SiON) or aluminum nitride (AlN), among other materials.

The N strips (strip 1 through strip N) have respective widths ($w_1$ through $w_N$) as measured in the x-direction. In some embodiments, the different widths ($w_1$ through $w_N$) of the N strips (strip 1 through strip N) are substantially equal in size, i.e., uniform, to each other. However, in some embodiments, the different widths ($w_1$ through $w_N$) of the N strips (strip 1 through strip N) are not uniform and vary in size with respect to each other. Each of the N strips (strip 1 through strip N) has the vertical thickness $t_2$. The N strips are spaced apart from each other in the x-direction by spacings $s_1$ through $s_{N-1}$, where spacing $s_1$ is measured in the x-direction between strip 1 and strip 2, and spacing $s_2$ is measured in the x-direction between strip 2 and strip 3, and so on, with spacing $s_{N-1}$ being measured in the x-direction between strip N−1 and strip N. In some embodiments, the different spacings ($s_1$ through $s_{N-1}$) between adjacently positioned ones of the N strips (strip 1 through strip N) are substantially equal in size, i.e., uniform, to each other. However, in some embodiments, the different spacings ($s_1$ through $s_{N-1}$) of the N strips (strip 1 through strip N) are not uniform and vary in size with respect to each other. For a given combination of slab layer 101 thickness $t_1$ and multiple strip layer 111 thickness $t_2$, the different widths ($w_1$ through $w_N$) of the N strips (strip 1 through strip N) and the different spacings ($s_1$ through $s_{N-1}$) between adjacently positioned ones of the N strips (strip 1 through strip N) are collectively defined to support either a single quasi-TE mode or multiple quasi-TE modes for the light propagating through the multi-strip-loaded optical waveguide 150.

Figure 2A:
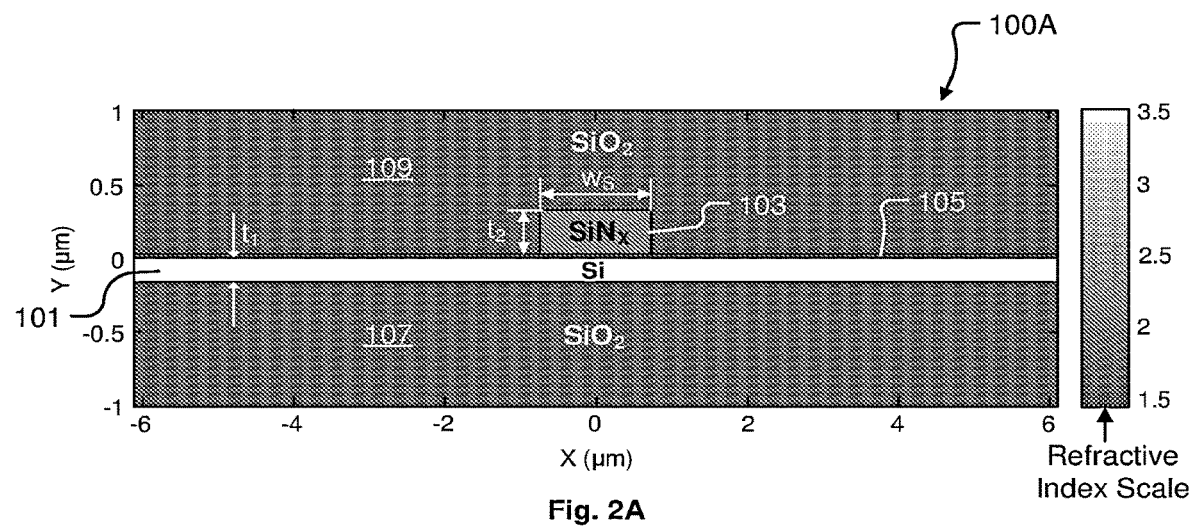
FIG. 2A shows a vertical cross-section view of a strip-loaded optical waveguide manufactured within a CMOS platform, in accordance with some embodiments.

FIG. 2A shows a vertical cross-section view of a strip-loaded optical waveguide 100A manufactured within a CMOS platform, in accordance with some embodiments. The strip-loaded optical waveguide 100A is an example implementation of the strip-loaded optical waveguide 100 of FIG. 1A. The slab layer 101 in the strip-loaded optical waveguide 100A is formed of silicon (Si). The strip layer 103 in the strip-loaded optical waveguide 100A is formed of silicon nitride ($SiN_x$). The underlying insulator layer 107 in the strip-loaded optical waveguide 100A is formed of silicon dioxide ($SiO_2$). The intermediate layer 105 in the strip-loaded optical waveguide 100A is formed of silicon dioxide ($SiO_2$). In some embodiments, the cladding region 109 in the strip-loaded optical waveguide 100A is formed of silicon oxide. In some embodiments, the cladding region 109 in the strip-loaded optical waveguide 100A is formed of silicon dioxide ($SiO_2$). FIG. 2A includes an optical refractive index (n) scale that indicates the optical refractive indexes of the various components within the strip-loaded optical waveguide 100A.

In the example strip-loaded optical waveguide 100A, the thickness $t_1$ of the slab layer 101 is about 160 nanometers (nm), the thickness $t_2$ of the strip layer 103 is about 300 nm, the thickness $t_3$ of the intermediate layer 105 is about 25 nm, and the width $w_s$ of the strip layer 103 is about 1.45 micrometers (μm). The strip-loaded optical waveguide 100A is an example of a single mode strip-loaded optical waveguide. In some embodiments, for the strip-loaded optical waveguide 100A, the thickness $t_1$ of the slab layer 101 is within a range extending from about 50 nanometers (nm) to about 4000 nm. In some embodiments, for the strip-loaded optical waveguide 100A, the thickness $t_2$ of the strip layer 103 is within a range extending from about 20 nm to about 2000 nm. In some embodiments, for the strip-loaded optical waveguide 100A, the thickness $t_3$ of the intermediate layer 105 is within a range extending from 0 nm to about 250 nm. In some embodiments, for the strip-loaded optical waveguide 100A, the width $w_s$ of the strip layer 103 is within a range extending from about 500 nm to about 3000 nm. The term "about" as used herein generally connotes plus or minus 10% of a stated value.

Figure 2B:
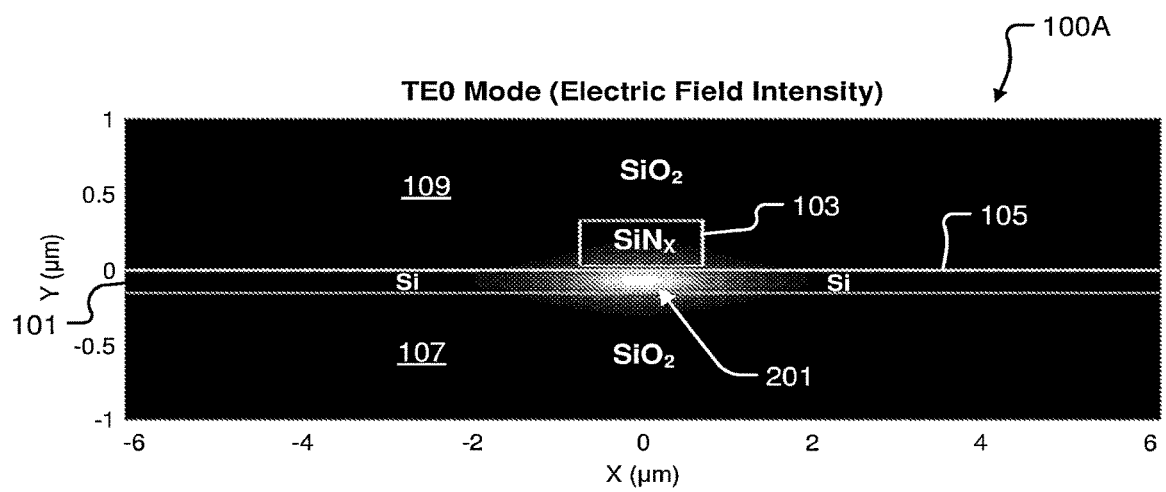
FIG. 2B shows a simulated quasi-TE optical mode of light propagating through the strip-loaded optical waveguide, in accordance with some embodiments.

FIG. 2B shows a simulated quasi-TE optical mode 201 of light propagating through the strip-loaded optical waveguide 100A, in accordance with some embodiments. In some embodiments, the TE0 mode 201 of light propagating through the strip-loaded optical waveguide 100A as shown in FIG. 2B is the only optical mode supported by the strip-loaded optical waveguide 100A at a propagating light wavelength of 1290 nm. In some embodiments, the propagating light wavelength for single-mode operation of the strip-loaded optical waveguide 100A is within a range extending from about 1 micrometer to about 17 micrometers. In some embodiments, the propagating light wavelength for single-mode operation of the strip-loaded optical waveguide 100A is set to cover a transparency window of both silicon and germanium.

Figure 2C:
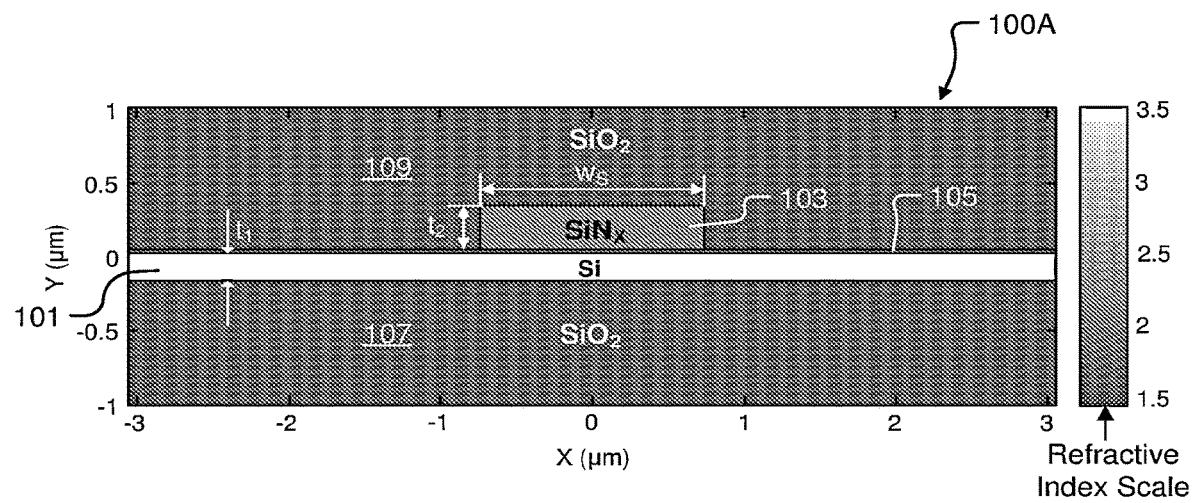
FIG. 2C shows a closer view of the vertical cross-section of the strip-loaded optical waveguide of FIG. 2A, in accordance with some embodiments.
Figure 2D:
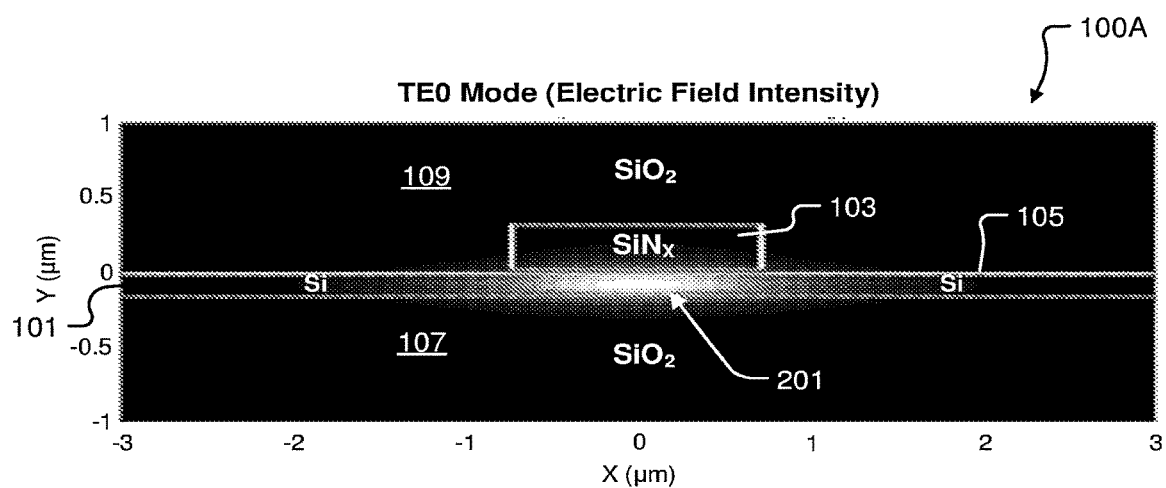
FIG. 2D shows a closer view of the simulated quasi-TE optical mode of light propagating through the strip-loaded optical waveguide of FIG. 2B, in accordance with some embodiments.

FIG. 2C shows a closer view of the vertical cross-section of the strip-loaded optical waveguide 100A of FIG. 2A, in accordance with some embodiments. FIG. 2D shows a closer view of the simulated quasi-TE optical mode of light propagating through the strip-loaded optical waveguide 100A of FIG. 2B, in accordance with some embodiments.

Figure 3A:
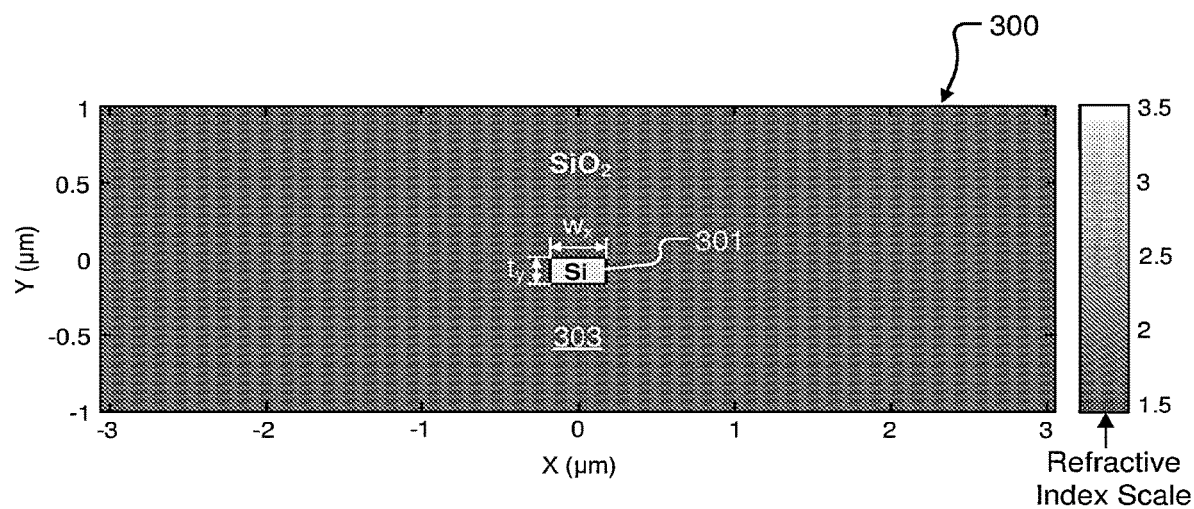
FIG. 3A shows a vertical cross-section view of a single mode strip optical waveguide manufactured within a CMOS platform, in accordance with some embodiments.

FIG. 3A shows a vertical cross-section view of a single mode strip optical waveguide 300 manufactured within a CMOS platform, in accordance with some embodiments. The single mode strip optical waveguide 300 includes an optical waveguide structure 301 formed as a strip of silicon (Si) surrounded by a cladding region 303 formed of silicon dioxide ($SiO_2$). FIG. 3A includes an optical refractive index (n) scale that indicates the optical refractive indexes of the various components within the single mode optical waveguide 300. In comparison with the strip-loaded optical waveguide 100A of FIG. 1A, the single mode strip optical waveguide 300 does not include the neighboring strip layer 103. Therefore, it should be understood that the single mode strip optical waveguide 300 is not a strip-loaded optical waveguide, such as described with regard to FIGS. 1A through 2D. In contrast to the slab layer 101 of the strip-loaded optical waveguide 100A of FIG. 1A, the optical waveguide structure 301 has a smaller width $w_x$ as measured in the x-direction. In the example single mode strip optical waveguide 300, the width $w_x$ of the optical waveguide structure 301 is about 250 nm, which is close to the single quasi-TE mode cutoff width $w_x$ for propagating light having a wavelength of 1290 nm. Like the slab layer 101 of the strip-loaded optical waveguide 100A of FIG. 1A, the optical waveguide structure 301 has a vertical thickness ty as measured in the y-direction of about 160 nm.

Figure 3B:
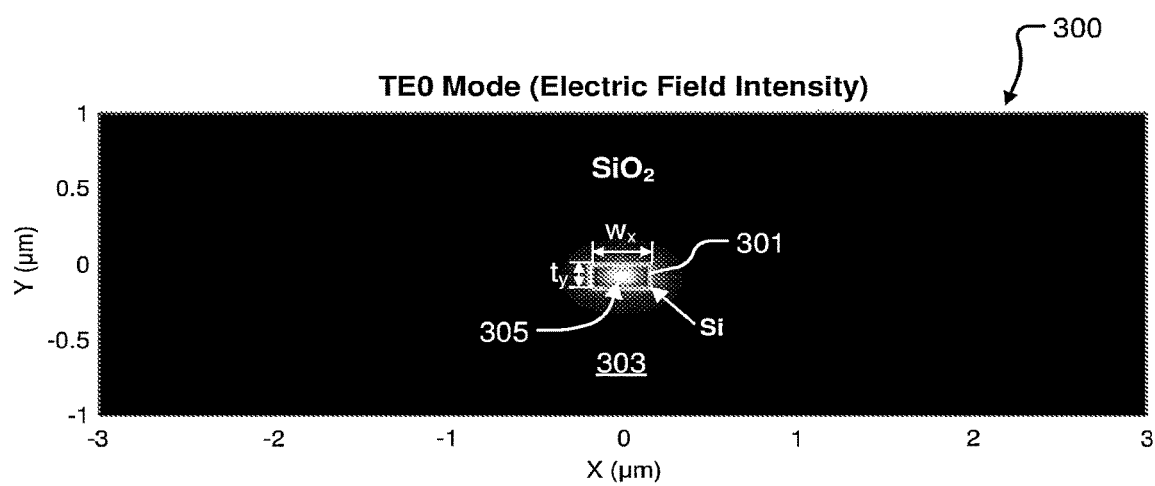
FIG. 3B shows a simulated quasi-TE optical mode of light propagating through the single mode strip optical waveguide of FIG. 3A, in accordance with some embodiments.

FIG. 3B shows a simulated quasi-TE optical mode 305 of light propagating through the single mode strip optical waveguide 300 of FIG. 3A, in accordance with some embodiments. As mentioned above, the width $w_x$ of the optical waveguide structure 301 as measured in the x-direction is close to the maximum allowable width for supporting only a single TE mode 305 of the propagating light. The single quasi-TE mode cutoff width is the width of the optical waveguide structure 301 above which the optical waveguide structure 301 supports multiple quasi-TE modes. Comparison of FIG. 2D with FIG. 3B demonstrates the increase in TE mode 201 area provided by the strip-loaded optical waveguide 100A of FIG. 1A as compared to the TE mode 305 area provided by the single mode strip optical waveguide 300 of FIG. 3A. Comparison of FIG. 2D with FIG. 3B demonstrates that the TE0 mode 201 of the strip-loaded waveguide 100A can be significantly larger than the TE0 mode 305 of the single mode strip optical waveguide 300 implemented in the same silicon layer.

FIG. 4A shows a vertical cross-section view of a strip-loaded optical waveguide 100B manufactured within a CMOS platform, in accordance with some embodiments. The strip-loaded optical waveguide 100B is an example implementation of the strip-loaded optical waveguide 100 of FIG. 1A. The slab layer 101 in the strip-loaded optical waveguide 100B is formed of silicon (Si). The strip layer 103 in the strip-loaded optical waveguide 100B is formed of silicon nitride ($SiN_x$). The underlying insulator layer 107 in the strip-loaded optical waveguide 100B is formed of silicon dioxide ($SiO_2$). The intermediate layer 105 in the strip-loaded optical waveguide 100B is formed of silicon dioxide ($SiO_2$). The cladding region 109 in the strip-loaded optical waveguide 100B is formed of silicon dioxide ($SiO_2$). FIG. 4A includes an optical refractive index (n) scale that indicates the optical refractive indexes of the various components within the strip-loaded optical waveguide 100B.

In the example strip-loaded optical waveguide 100B, the thickness $t_1$ of the slab layer 101 is about 160 nm, the thickness $t_2$ of the strip layer 103 is about 300 nm, the thickness $t_3$ of the intermediate layer 105 is about 25 nm, and the width $w_s$ of the strip layer 103 is about 5 μm. The strip-loaded optical waveguide 100B is an example of a multi-mode strip-loaded optical waveguide in which the width $w_s$ of the strip layer 103 is defined large enough to support multiple modes of propagating light with the slab layer 101. In some embodiments, for the multi-mode strip-loaded optical waveguide 100B, the thickness $t_1$ of the slab layer 101 is within a range extending from about 50 nm to about 4000 nm. In some embodiments, for the multi-mode strip-loaded optical waveguide 100B, the thickness $t_2$ of the strip layer 103 is within a range extending from about 20 nm to about 2000 nm. In some embodiments, for the multi-mode strip-loaded optical waveguide 100B, the thickness $t_3$ of the intermediate layer 105 is within a range extending from 0 nm to about 250 nm. In some embodiments, for the multi-mode strip-loaded optical waveguide 100B, the width $w_s$ of the strip layer 103 is within a range extending from about 0.5 micrometer to about 100 micrometers. In some embodiments, the width $w_s$ of the strip layer 103 is set large enough to include coverage for large free space regions or MMI (multi-mode interferometer) regions which are effectively highly multi-mode optical waveguides.

FIG. 4B shows a simulated quasi-TE0 optical mode 400 of light propagating through the strip-loaded optical waveguide 100B of FIG. 4A, in accordance with some embodiments. FIG. 4C shows a simulated quasi-TE1 optical mode 401 of light propagating through the strip-loaded optical waveguide 100B of FIG. 4A, in accordance with some embodiments. FIG. 4D shows a simulated quasi-TE2 optical mode 402 of light propagating through the strip-loaded optical waveguide 100B of FIG. 4A, in accordance with some embodiments. In the examples of FIGS. 4B, 4C, and 4D, the light propagating through the strip-loaded optical waveguide 100B has a wavelength of 1290 nm. In some embodiments, the propagating light wavelength for multi-mode operation of the strip-loaded optical waveguide 100B is within a range extending from about 1 micrometer to about 17 micrometers. In some embodiments, the propagating light wavelength for multi-mode operation of the strip-loaded optical waveguide 100B is set to cover a transparency window of both silicon and germanium.

Figure 5A:
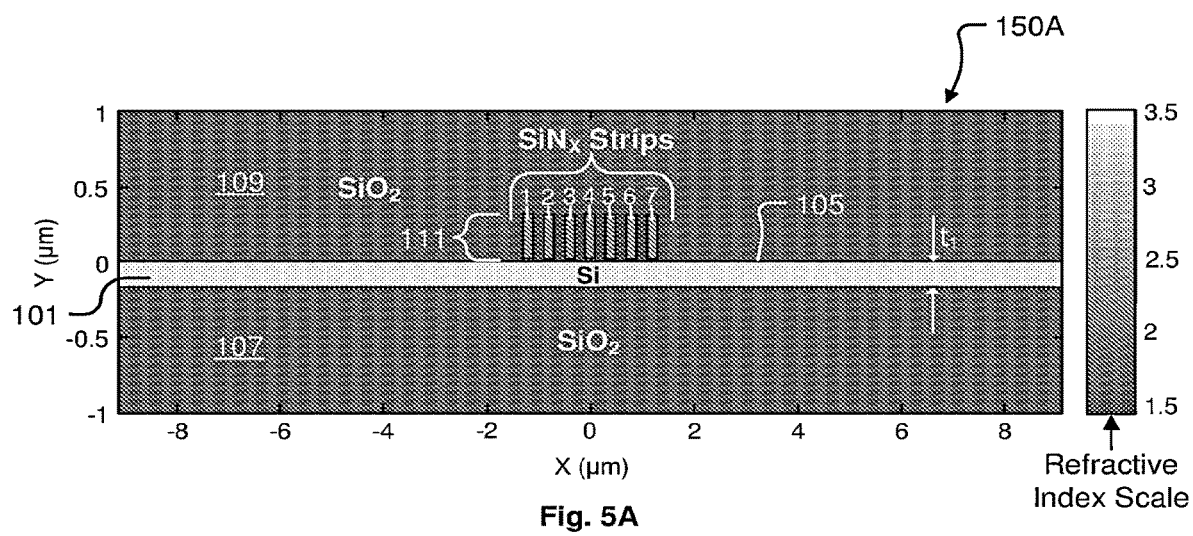
FIG. 5A shows a vertical cross-section view of a multi-strip-loaded optical waveguide manufactured within a CMOS platform, in accordance with some embodiments.

FIG. 5A shows a vertical cross-section view of a multi-strip-loaded optical waveguide 150A manufactured within a CMOS platform, in accordance with some embodiments. The multi-strip-loaded optical waveguide 150A is an example implementation of the multi-strip-loaded optical waveguide 150 of FIG. 1B, where N equals seven (7), such that the strip layer 111 of the multi-strip-loaded optical waveguide 150A includes seven strips (strip 1 through strip 7). The slab layer 101 in the multi-strip-loaded optical waveguide 150A is formed of silicon (Si). Each of the seven strips (strip 1 through strip 7) in the multi-strip-loaded optical waveguide 150A is formed of silicon nitride ($SiN_x$). The underlying insulator layer 107 in the multi-strip-loaded optical waveguide 150A is formed of silicon dioxide ($SiO_2$). The intermediate layer 105 in the multi-strip-loaded optical waveguide 150A is formed of silicon dioxide ($SiO_2$). The cladding region 109 in the multi-strip-loaded optical waveguide 150A is formed of silicon dioxide ($SiO_2$). FIG. 5A includes an optical refractive index (n) scale that indicates the optical refractive indexes of the various components within the multi-strip-loaded optical waveguide 150A.

In the example multi-strip-loaded optical waveguide 150A, the thickness $t_1$ of the slab layer 101 is about 160 nm, the thickness $t_2$ of each of the seven strips (strip 1 through strip 7) is about 300 nm, and the thickness $t_3$ of the intermediate layer 105 is about 25 nm. Each of the widths $w_1$ through $w_7$ of the seven strips (strip 1 through strip 7, respectively) is about 200 nm. Each of the strip-to-strip spacings $s_1$ through $s_6$ between adjacently positioned ones of the seven strips (strip 1 through strip 7) is about 200 nm. The multi-strip-loaded optical waveguide 150A is an example of a single mode multi-strip-loaded optical waveguide.

Figure 5B:
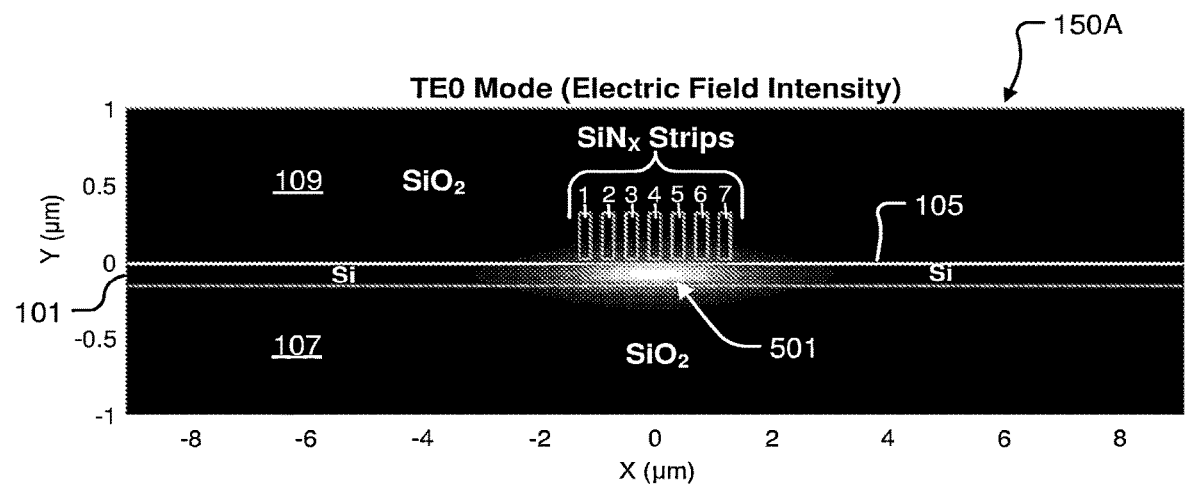
FIG. 5B shows a simulated quasi-TE (TE0) optical mode of light propagating through the multi-strip-loaded optical waveguide, in accordance with some embodiments.

FIG. 5B shows a simulated quasi-TE (TE0) optical mode 501 of light propagating through the multi-strip-loaded optical waveguide 150A, in accordance with some embodiments. In some embodiments, the TE0 mode 501 of light propagating through the multi-strip-loaded optical waveguide 150A as shown in FIG. 5B is the one optical mode supported by the multi-strip-loaded optical waveguide 150A at a propagating light wavelength of 1290 nm.

FIG. 6A shows a vertical cross-section view of a multi-strip-loaded optical waveguide 150B manufactured within a CMOS platform, in accordance with some embodiments. The multi-strip-loaded optical waveguide 150B is an example implementation of the multi-strip-loaded optical waveguide 150 of FIG. 1B, where N equals seventeen (17), such that the strip layer 111 of the multi-strip-loaded optical waveguide 150B includes seventeen strips (strip 1 through strip 17). The slab layer 101 in the multi-strip-loaded optical waveguide 150B is formed of silicon (Si). Each of the seventeen strips (strip 1 through strip 17) in the multi-strip-loaded optical waveguide 150B is formed of silicon nitride ($SiN_x$). The underlying insulator layer 107 in the multi-strip-loaded optical waveguide 150B is formed of silicon dioxide ($SiO_2$). The intermediate layer 105 in the multi-strip-loaded optical waveguide 150B is formed of silicon dioxide ($SiO_2$). The cladding region 109 in the multi-strip-loaded optical waveguide 150B is formed of silicon dioxide ($SiO_2$). FIG. 6A includes an optical refractive index (n) scale that indicates the optical refractive indexes of the various components within the multi-strip-loaded optical waveguide 150B.

In the example multi-strip-loaded optical waveguide 150B, the thickness $t_1$ of the slab layer 101 is about 160 nm, the thickness $t_2$ of each of the seventeen strips (strip 1 through strip 17) is about 300 nm, and the thickness $t_3$ of the intermediate layer 105 is about 25 nm. Each of the widths $w_1$ through $w_7$ of the seventeen strips (strip 1 through strip 17, respectively) is about 200 nm. Each of the strip-to-strip spacings $s_1$ through $s_{16}$ between adjacently positioned ones of the seventeen strips (strip 1 through strip 17) is about 200 nm. The multi-strip-loaded optical waveguide 150B is an example of a multimode multi-strip-loaded optical waveguide.

FIG. 6B shows a simulated quasi-TE0 optical mode 600 of light propagating through the multi-strip-loaded optical waveguide 150B, in accordance with some embodiments. FIG. 6C shows a simulated quasi-TE1 optical mode 601 of light propagating through the multi-strip-loaded optical waveguide 150B, in accordance with some embodiments. FIG. 6D shows a simulated quasi-TE2 optical mode 602 of light propagating through the multi-strip-loaded optical waveguide 150B, in accordance with some embodiments. In the examples of FIGS. 6B, 6C, and 6D, the light propagating through the multi-strip-loaded optical waveguide 150B has a wavelength of 1290 nm.

Figure 7A:
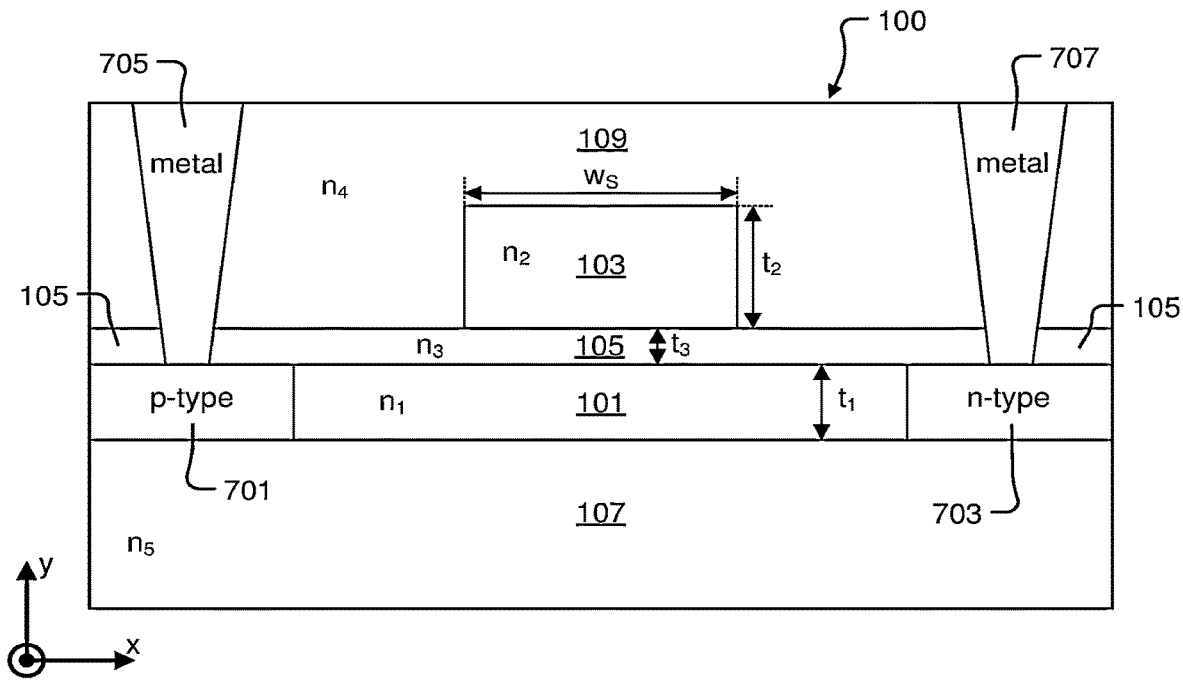
FIG. 7A shows a vertical cross-section view of the strip-loaded optical waveguide of FIG. 1A in which a PIN junction diode is implemented across the strip-loaded optical waveguide in the x-direction, in accordance with some embodiments.

FIG. 7A shows a vertical cross-section view of the strip-loaded optical waveguide 100 of FIG. 1A in which a PIN junction diode is implemented across the strip-loaded optical waveguide 100 in the x-direction, in accordance with some embodiments. A p-type doped region 701 is formed at the slab layer 101 level on a first side of the strip layer 103 relative to the x-direction. An n-type doped region 703 is formed at the slab layer 101 level on a second side of the strip layer 103 relative to the x-direction. A first electrically conductive metal contact 705 is formed to extend vertically in the y-direction through the cladding region 109 and the intermediate layer 105 (when present) to electrically contact the p-type doped region 701. A second electrically conductive metal contact 707 is formed to extend vertically in the y-direction through the cladding region 109 and the intermediate layer 105 (when present) to electrically contact the n-type doped region 703. In this manner, the first metal contact 705 and the second metal contact 707 are formed on opposite sides of the propagating light guiding region within the strip-loaded optical waveguide 100.

A portion of the slab layer 101 extending between the p-type doped region 701 and the n-type doped region 703 functions as an intrinsic region, such that the p-type doped region 701, the n-type doped region 703, and the portion of the slab layer 101 extending between the p-type doped region 701 and the n-type doped region 703 collectively form a PIN junction diode within the strip-loaded optical waveguide 100. In some embodiments, the width of the p-type doped region 701 and the width of the n-type doped region 703 are defined so that the p-type doped region 701 and the n-type doped region 703 contact each other at a location beneath the strip layer 103, such that the p-type doped region 701 and the n-type doped region 703 collectively form a PN junction diode within the strip-loaded optical waveguide 100.

In some embodiments, a voltage potential is applied between the first metal contact 705 and the second metal contact 707, such that the voltage potential is applied across the portion of the slab layer 101 extending between the p-type doped region 701 and the n-type doped region 703. In some embodiments, the voltage potential applied across the portion of the slab layer 101 extending between the p-type doped region 701 and the n-type doped region 703 is controlled to locally decrease a free carrier concentration within the propagating light guiding portion of the slab layer 101. In some embodiments, the voltage potential applied across the portion of the slab layer 101 extending between the p-type doped region 701 and the n-type doped region 703 is controlled to locally increase the free carrier concentration within the propagating light guiding portion of the slab layer 101. In some embodiments, the voltage potential applied across the portion of the slab layer 101 extending between the p-type doped region 701 and the n-type doped region 703 is controlled to apply a specifically controlled electric field across the propagating light guiding portion of the slab layer 101.

Figure 7B:
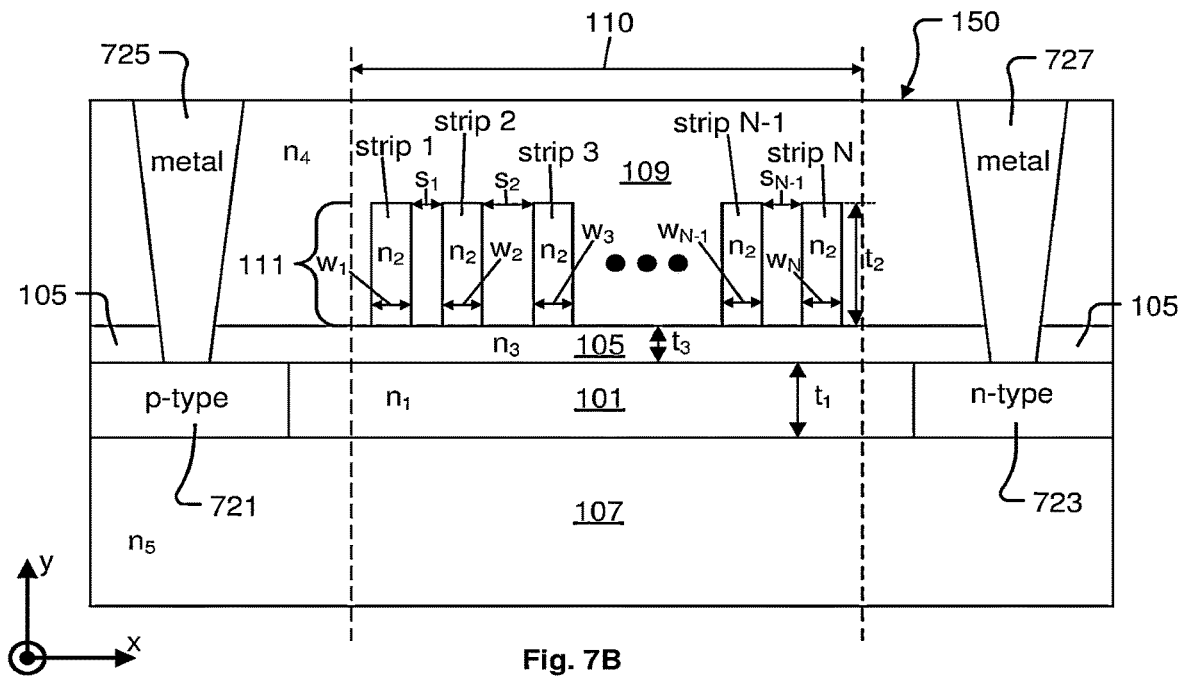
FIG. 7B shows a vertical cross-section view of the multi-strip-loaded optical waveguide of FIG. 1B in which a PIN junction diode is implemented across the multi-strip-loaded optical waveguide in the x-direction, in accordance with some embodiments.

FIG. 7B shows a vertical cross-section view of the multi-strip-loaded optical waveguide 150 of FIG. 1B in which a PIN junction diode is implemented across the multi-strip-loaded optical waveguide 150 in the x-direction, in accordance with some embodiments. A p-type doped region 721 is formed at the slab layer 101 level on a first side of the multiple strip layer 111 relative to the x-direction. An n-type doped region 723 is formed at the slab layer 101 level on a second side of the multiple strip layer 111 relative to the x-direction. A first electrically conductive metal contact 725 is formed to extend vertically in the y-direction through the cladding region 109 and the intermediate layer 105 (when present) to electrically contact the p-type doped region 721. A second electrically conductive metal contact 727 is formed to extend vertically in the y-direction through the cladding region 109 and the intermediate layer 105 (when present) to electrically contact the n-type doped region 723. In this manner, the first metal contact 725 and the second metal contact 727 are formed on opposite sides of the propagating light guiding region 110 within the multi-strip-loaded optical waveguide 150.

A portion of the slab layer 101 extending between the p-type doped region 721 and the n-type doped region 723 functions as an intrinsic region, such that the p-type doped region 721, the n-type doped region 723, and the portion of the slab layer 101 extending between the p-type doped region 721 and the n-type doped region 723 collectively form a PIN junction diode within the multi-strip-loaded optical waveguide 150. In some embodiments, the width of the p-type doped region 721 and the width of the n-type doped region 723 are defined so that the p-type doped region 721 and the n-type doped region 723 contact each other at a location beneath the multiple strip layer 111, such that the p-type doped region 721 and the n-type doped region 723 collectively form a PN junction diode within the multi-strip-loaded optical waveguide 150.

In some embodiments, a voltage potential is applied between the first metal contact 725 and the second metal contact 727, such that the voltage potential is applied across the portion of the slab layer 101 extending between the p-type doped region 721 and the n-type doped region 723. In some embodiments, the voltage potential applied across the portion of the slab layer 101 extending between the p-type doped region 721 and the n-type doped region 723 is controlled to locally decrease a free carrier concentration within the propagating light guiding region 110 of the slab layer 101. In some embodiments, the voltage potential applied across the portion of the slab layer 101 extending between the p-type doped region 721 and the n-type doped region 723 is controlled to locally increase the free carrier concentration within the propagating light guiding region 110 of the slab layer 101. In some embodiments, the voltage potential applied across the portion of the slab layer 101 extending between the p-type doped region 721 and the n-type doped region 723 is controlled to apply a specifically controlled electric field across the propagating light guiding region 110 of the slab layer 101.

Figure 8A:
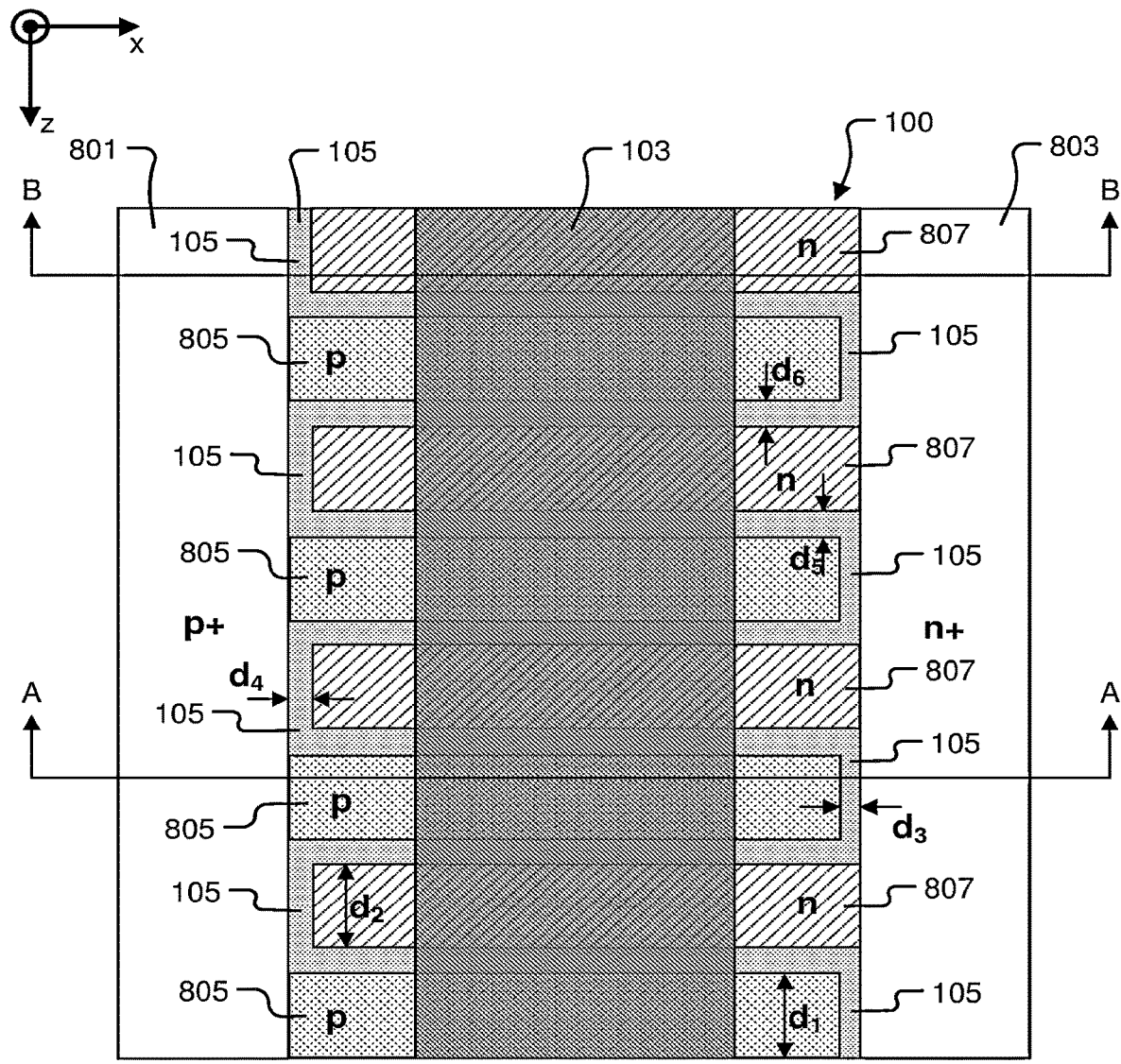
FIG. 8A shows a top view of the strip-loaded optical waveguide of FIG. 1A in which interleaved PIN/PN junction diodes are implemented within the strip-loaded optical waveguide, in accordance with some embodiments.
Figure 8B:
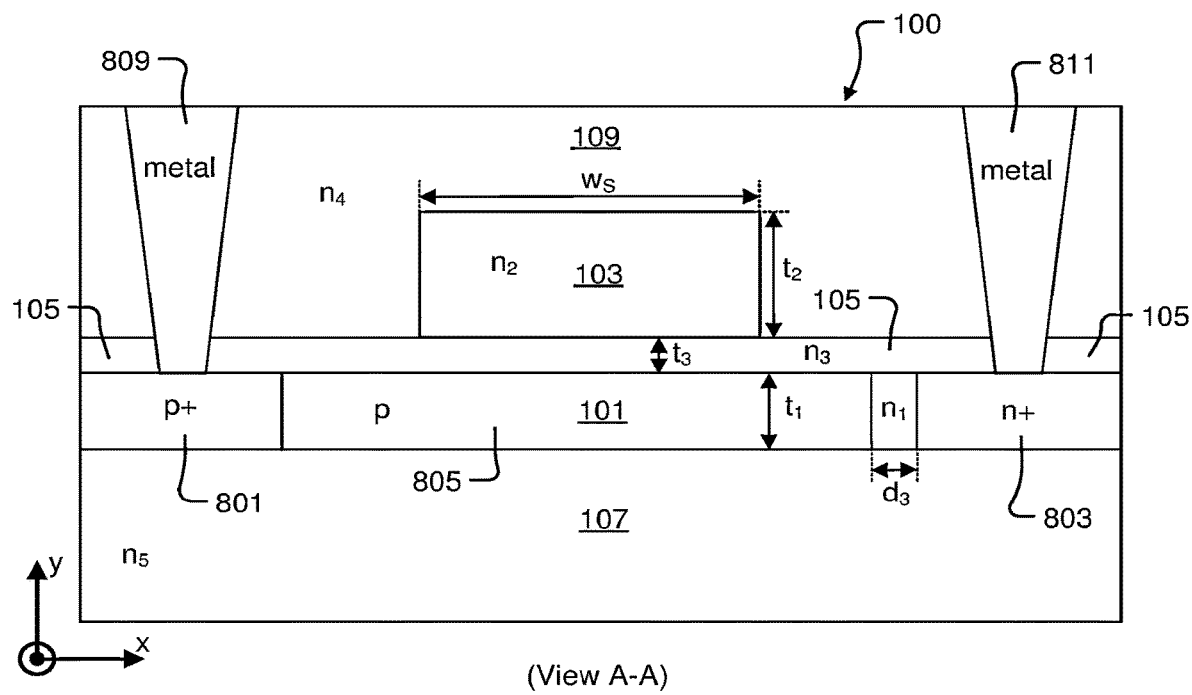
FIG. 8B shows a vertical cross-section view through the strip-loaded optical waveguide of FIG. 8A, referenced as View A-A, in accordance with some embodiments.
Figure 8C:
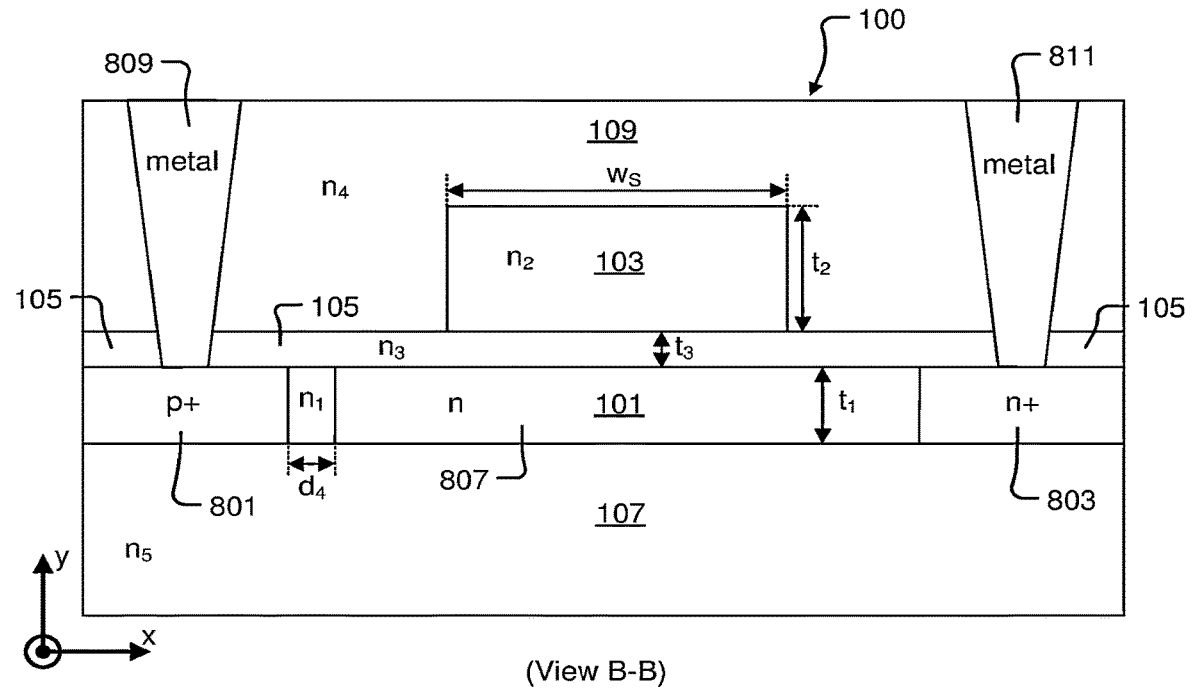
FIG. 8C shows another vertical cross-section view through the strip-loaded optical waveguide of FIG. 8A, referenced as View B-B, in accordance with some embodiments.

FIG. 8A shows a top view of the strip-loaded optical waveguide 100 of FIG. 1A in which interleaved PIN/PN junction diodes are implemented within the strip-loaded optical waveguide 100, in accordance with some embodiments. FIG. 8B shows a vertical cross-section view through the strip-loaded optical waveguide 100 of FIG. 8A, referenced as View A-A, in accordance with some embodiments. FIG. 8C shows another vertical cross-section view through the strip-loaded optical waveguide 100 of FIG. 8A, referenced as View B-B, in accordance with some embodiments.

A p-type heavily doped region 801 is formed at the slab layer 101 level on a first side of the strip layer 103 relative to the x-direction. An n-type heavily doped region 803 is formed at the slab layer 101 level on a second side of the strip layer 103 relative to the x-direction. A first electrically conductive metal contact 809 is formed to extend vertically in the y-direction through the cladding region 109 and the intermediate layer 105 (when present) to electrically contact the p-type heavily doped region 801. A second electrically conductive metal contact 811 is formed to extend vertically in the y-direction through the cladding region 109 and the intermediate layer 105 (when present) to electrically contact the n-type heavily doped region 803. In this manner, the p-type heavily doped region 801 and the n-type heavily doped region 803 are formed to provide for ohmic metal contacts. The first metal contact 809 and the second metal contact 811 are formed on opposite sides of the propagating light guiding region 110 within the strip-loaded optical waveguide 100.

A series of p-type doped regions 805 are formed at the slab layer 101 level to extend from the p-type heavily doped region 801 across the propagating light guiding region beneath the strip layer 103. A series of n-type doped regions 807 are formed at the slab layer 101 level to extend from the n-type heavily doped region 803 across the propagating light guiding region beneath the strip layer 103. The p-type doped regions 805 and the n-type doped regions 807 are alternately positioned along the length of the strip-loaded optical waveguide 100 in the z-direction. In this manner, the series of p-type doped regions 805 and the series of n-type doped regions 807 are interleaved along the length of the strip-loaded optical waveguide 100 in the z-direction. Portions of the slab layer 101 located between neighboring ones of the p-type doped regions 805 and the n-type doped regions 807 function as intrinsic regions, such that the p-type doped regions 805, the n-type doped regions 807, and the portions of the slab layer 101 located between the p-type doped regions 805 and the n-type doped regions 807 collectively form various PIN junction diodes within the strip-loaded optical waveguide 100.

In some embodiments, the length $d_1$ of the p-type doped regions 805, as measured in the z-direction, and the length $d_2$ of the n-type doped regions 807, as measured in the z-direction, are defined separately with respect to each other and can vary from one implementation to another. In some embodiments, the length $d_1$ of the p-type doped regions 805, as measured in the z-direction, is substantially uniform within the series of p-type doped regions 805 formed along the length of the strip-loaded optical waveguide 100 in the z-direction. In some embodiments, different ones of the p-type doped regions 805 have different lengths $d_1$, as measured in the z-direction, within the series of p-type doped regions 805 formed along the length of the strip-loaded optical waveguide 100 in the z-direction. In some embodiments, the length $d_1$ of the p-type doped regions 805 is within a range extending from 0 micrometer to about 20 micrometers.

In some embodiments, the length $d_2$ of the n-type doped regions 807, as measured in the z-direction, is substantially uniform within the series of n-type doped regions 807 formed along the length of the strip-loaded optical waveguide 100 in the z-direction. In some embodiments, different ones of the n-type doped regions 807 have different lengths $d_2$, as measured in the z-direction, within the series of n-type doped regions 807 formed along the length of the strip-loaded optical waveguide 100 in the z-direction. In some embodiments, the length $d_2$ of the n-type doped regions 807 is within a range extending from 0 micrometer to about 20 micrometers.

The p-type doped regions 805 are separated from the n-type heavily doped region 803 by a distance $d_3$ as measured in the x-direction. The n-type doped regions 807 are separated from the p-type heavily doped region 801 by a distance $d_4$ as measured in the x-direction. A given one of the n-type doped regions 807 is separated from a first neighboring one of the p-type doped regions 805 by a distance $d_5$ as measured in the z-direction, and from a second neighboring one of the p-type doped regions 805 by a distance $d_6$ as measured in the z-direction. The distances $d_3$, $d_4$, $d_5$, and $d_6$ define the sizes of intrinsic regions that exist between the p-type doped regions 801/805 and the n-type doped regions 803/807.

In various embodiments, the distance $d_3$ at a given location within the strip-loaded optical waveguide 100 is greater than zero, such that a PIN junction diode is formed by the p-type doped region 805, the n-type heavily doped region 803, and the intervening portion of the slab layer 101 at the given location. In various embodiments, the distance $d_3$ at a given location within the strip-loaded optical waveguide 100 is zero, such that a PN junction diode is formed by the p-type doped region 805 and the n-type heavily doped region 803 at the given location. In some embodiments, the distance $d_3$ at a given location within the strip-loaded optical waveguide 100 is within a range extending from 0 nm to about 500 nm.

In various embodiments, the distance $d_4$ at a given location within the strip-loaded optical waveguide 100 is greater than zero, such that a PIN junction diode is formed by the n-type doped region 807, the p-type heavily doped region 801, and the intervening portion of the slab layer 101 at the given location. In various embodiments, the distance $d_4$ at a given location within the strip-loaded optical waveguide 100 is zero, such that a PN junction diode is formed by the n-type doped region 807 and the p-type heavily doped region 801 at the given location. In some embodiments, the distance $d_4$ at a given location within the strip-loaded optical waveguide 100 is within a range extending from 0 nm to about 500 nm.

In various embodiments, the distance $d_5$ at a given location within the strip-loaded optical waveguide 100 is greater than zero, such that a PIN junction diode is formed by the neighboring p-type doped region 805 and n-type doped region 807 and the intervening portion of the slab layer 101 at the given location. In various embodiments, the distance $d_5$ at a given location within the strip-loaded optical waveguide 100 is zero, such that a PN junction diode is formed by the neighboring p-type doped region 805 and n-type doped region 807 at the given location. In some embodiments, the distance $d_5$ at a given location within the strip-loaded optical waveguide 100 is within a range extending from 0 nm to about 500 nm.

In various embodiments, the distance $d_6$ at a given location within the strip-loaded optical waveguide 100 is greater than zero, such that a PIN junction diode is formed by the neighboring p-type doped region 805 and n-type doped region 807 and the intervening portion of the slab layer 101 at the given location. In various embodiments, the distance $d_6$ at a given location within the strip-loaded optical waveguide 100 is zero, such that a PN junction diode is formed by the neighboring p-type doped region 805 and n-type doped region 807 at the given location. In some embodiments, the distance $d_6$ at a given location within the strip-loaded optical waveguide 100 is within a range extending from 0 nm to about 500 nm.

Figure 9A:
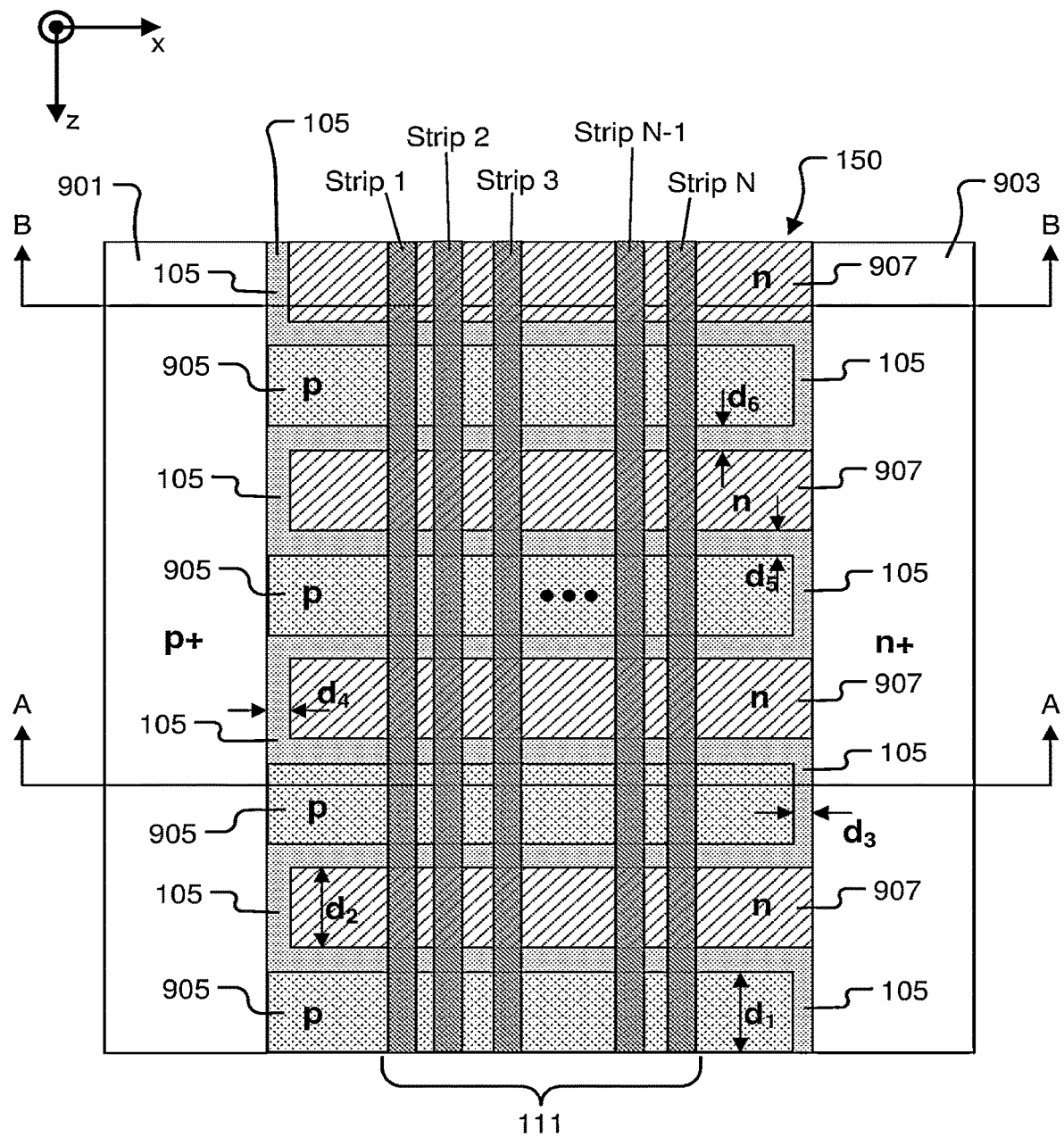
FIG. 9A shows a top view of the multi-strip-loaded optical waveguide of FIG. 1B in which interleaved PIN/PN junction diodes are implemented within the multi-strip-loaded optical waveguide, in accordance with some embodiments.
Figure 9B:
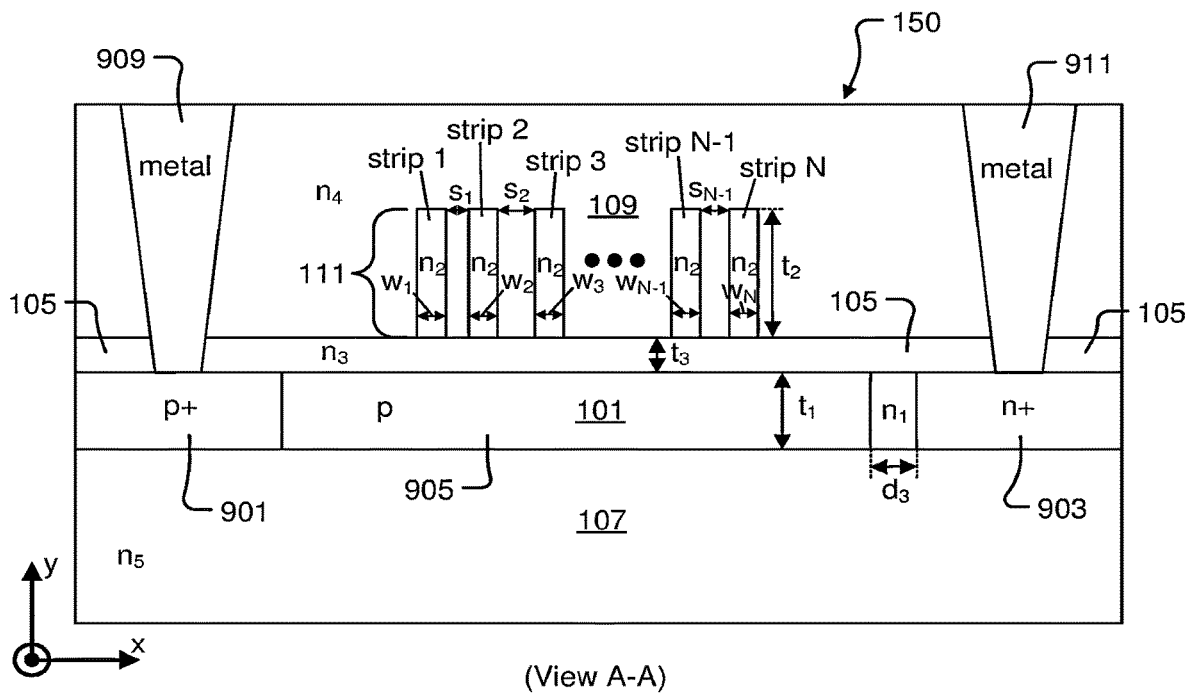
FIG. 9B shows a vertical cross-section view through the multi-strip-loaded optical waveguide of FIG. 9A, referenced as View A-A, in accordance with some embodiments.
Figure 9C:
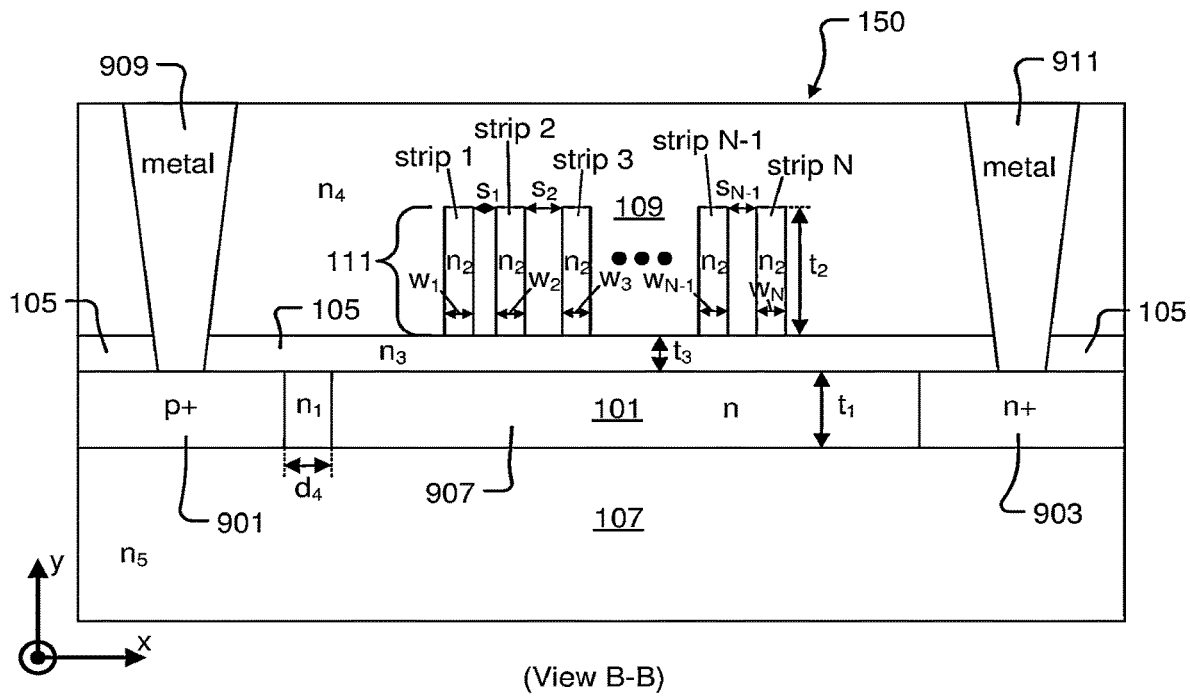
FIG. 9C shows another vertical cross-section view through the multi-strip-loaded optical waveguide of FIG. 9A, referenced as View B-B, in accordance with some embodiments.

FIG. 9A shows a top view of the multi-strip-loaded optical waveguide 150 of FIG. 1B in which interleaved PIN/PN junction diodes are implemented within the multi-strip-loaded optical waveguide 150, in accordance with some embodiments. FIG. 9B shows a vertical cross-section view through the multi-strip-loaded optical waveguide 150 of FIG. 9A, referenced as View A-A, in accordance with some embodiments. FIG. 9C shows another vertical cross-section view through the multi-strip-loaded optical waveguide 150 of FIG. 9A, referenced as View B-B, in accordance with some embodiments.

A p-type heavily doped region 901 is formed at the slab layer 101 level on a first side of the multiple strip layer 111 relative to the x-direction. An n-type heavily doped region 903 is formed at the slab layer 101 level on a second side of the multiple strip layer 111 relative to the x-direction. A first electrically conductive metal contact 909 is formed to extend vertically in the y-direction through the cladding region 109 and the intermediate layer 105 (when present) to electrically contact the p-type heavily doped region 901. A second electrically conductive metal contact 911 is formed to extend vertically in the y-direction through the cladding region 109 and the intermediate layer 105 (when present) to electrically contact the n-type heavily doped region 903. In this manner, the p-type heavily doped region 901 and the n-type heavily doped region 903 are formed to provide for ohmic metal contacts. The first metal contact 909 and the second metal contact 911 are formed on opposite sides of the propagating light guiding region 110 within the multi-strip-loaded optical waveguide 150.

A series of p-type doped regions 905 are formed at the slab layer 101 level to extend from the p-type heavily doped region 901 across the propagating light guiding region beneath the strip layer 103. A series of n-type doped regions 907 are formed at the slab layer 101 level to extend from the n-type heavily doped region 903 across the propagating light guiding region beneath the strip layer 103. The p-type doped regions 905 and the n-type doped regions 907 are alternately positioned along the length of the multi-strip-loaded optical waveguide 150 in the z-direction. In this manner, the series of p-type doped regions 905 and the series of n-type doped regions 907 are interleaved along the length of the multi-strip-loaded optical waveguide 150 in the z-direction. Portions of the slab layer 101 located between neighboring ones of the p-type doped regions 905 and the n-type doped regions 907 function as intrinsic regions, such that the p-type doped regions 905, the n-type doped regions 907, and the portions of the slab layer 101 located between the p-type doped regions 905 and the n-type doped regions 907 collectively form various PIN junction diodes within the multi-strip-loaded optical waveguide 150.

In some embodiments, the length $d_1$ of the p-type doped regions 905, as measured in the z-direction, and the length $d_2$ of the n-type doped regions 907, as measured in the z-direction, are defined separately with respect to each other and can vary from one implementation to another. In some embodiments, the length $d_1$ of the p-type doped regions 905, as measured in the z-direction, are substantially uniform within the series of p-type doped regions 905 formed along the length of the multi-strip-loaded optical waveguide 150 in the z-direction. In some embodiments, different ones of the p-type doped regions 905 have different lengths $d_1$, as measured in the z-direction, within the series of p-type doped regions 905 formed along the length of the multi-strip-loaded optical waveguide 150 in the z-direction. In some embodiments, the length $d_1$ of the p-type doped regions 905 is within a range extending from 0 micrometer to about 20 micrometers.

In some embodiments, the length $d_2$ of the n-type doped regions 907, as measured in the z-direction, are substantially uniform within the series of n-type doped regions 907 formed along the length of the multi-strip-loaded optical waveguide 150 in the z-direction. In some embodiments, different ones of the n-type doped regions 907 have different lengths $d_2$, as measured in the z-direction, within the series of n-type doped regions 907 formed along the length of the multi-strip-loaded optical waveguide 150 in the z-direction. In some embodiments, the length $d_2$ of the n-type doped regions 907 is within a range extending from 0 micrometer to about 20 micrometers.

The p-type doped regions 905 are separated from the n-type heavily doped region 903 by a distance $d_3$ as measured in the x-direction. The n-type doped regions 907 are separated from the p-type heavily doped region 901 by a distance $d_4$ as measured in the x-direction. A given one of the n-type doped regions 907 is separated from a first neighboring one of the p-type doped regions 905 by a distance $d_5$ as measured in the z-direction, and from a second neighboring one of the p-type doped regions 905 by a distance $d_6$ as measured in the z-direction. The distances $d_3$, $d_4$, $d_5$, and $d_6$ define the sizes of intrinsic regions that exist between the p-type doped regions 901/905 and the n-type doped regions 903/907.

In various embodiments, the distance $d_3$ at a given location within the multi-strip-loaded optical waveguide 150 is greater than zero, such that a PIN junction diode is formed by the p-type doped region 905, the n-type heavily doped region 903, and the intervening portion of the slab layer 101 at the given location. In various embodiments, the distance $d_3$ at a given location within the multi-strip-loaded optical waveguide 150 is zero, such that a PN junction diode is formed by the p-type doped region 905 and the n-type heavily doped region 903 at the given location. In some embodiments, the distance $d_3$ at a given location within the multi-strip-loaded optical waveguide 150 is within a range extending from 0 nm to about 500 nm.

In various embodiments, the distance $d_4$ at a given location within the multi-strip-loaded optical waveguide 150 is greater than zero, such that a PIN junction diode is formed by the n-type doped region 907, the p-type heavily doped region 901, and the intervening portion of the slab layer 101 at the given location. In various embodiments, the distance $d_4$ at a given location within the multi-strip-loaded optical waveguide 150 is zero, such that a PN junction diode is formed by the n-type doped region 907 and the p-type heavily doped region 901 at the given location. In some embodiments, the distance $d_4$ at a given location within the multi-strip-loaded optical waveguide 150 is within a range extending from 0 nm to about 500 nm.

In various embodiments, the distance $d_5$ at a given location within the multi-strip-loaded optical waveguide 150 is greater than zero, such that a PIN junction diode is formed by the neighboring p-type doped region 905 and n-type doped region 907 and the intervening portion of the slab layer 101 at the given location. In various embodiments, the distance $d_5$ at a given location within the multi-strip-loaded optical waveguide 150 is zero, such that a PN junction diode is formed by the neighboring p-type doped region 905 and n-type doped region 907 at the given location. In some embodiments, the distance $d_5$ at a given location within the multi-strip-loaded optical waveguide 150 is within a range extending from 0 nm to about 500 nm.

In various embodiments, the distance $d_6$ at a given location within the multi-strip-loaded optical waveguide 150 is greater than zero, such that a PIN junction diode is formed by the neighboring p-type doped region 905 and n-type doped region 907 and the intervening portion of the slab layer 101 at the given location. In various embodiments, the distance $d_6$ at a given location within the multi-strip-loaded optical waveguide 150 is zero, such that a PN junction diode is formed by the neighboring p-type doped region 905 and n-type doped region 907 at the given location. In some embodiments, the distance $d_6$ at a given location within the multi-strip-loaded optical waveguide 150 is within a range extending from 0 nm to about 500 nm.

In some embodiments, the strip-loaded optical waveguide 100, 100A, 100B includes the slab layer 101, the strip layer 103, and the cladding region 109. The slab layer 101 has the optical refractive index ($n_1$) and a first width measured in a transverse direction (x-direction) that is perpendicular to a light propagation direction (z-direction) through the strip-loaded optical waveguide 100, 100A, 100B. The strip layer 103 is disposed above the slab layer 101. The strip layer 103 has the optical refractive index ($n_2$) and a second width ($w_s$) as measured in the transverse direction (x-direction). The second width ($w_s$) of the strip layer 103 is less than the first width of the slab layer 101. The optical refractive index ($n_2$) of the strip layer 103 is less than the optical refractive index ($n_1$) of the slab layer 101. The cladding region 109 is disposed above the slab layer 101 and above the strip layer 103. The cladding region 109 has the optical refractive index ($n_4$) that is less than the optical refractive index ($n_2$) of the strip layer 103. In some embodiments, the strip-loaded optical waveguide 100, 100A, 100B includes the insulator layer 107, where the slab layer 101 is disposed on the insulator layer 107. The insulator layer 107 has the optical refractive index ($n_5$) that is less than optical refractive index ($n_1$) of the slab layer 101. In some embodiments, the strip-loaded optical waveguide 100, 100A, 100B includes the intermediate layer 105 disposed over the slab layer 101 and below the strip layer 103. The intermediate layer 105 has the optical refractive index ($n_3$) that is less than or equal to the optical refractive index ($n_1$) of the slab layer 101.

The strip layer 103 provides a locally increased effective optical refractive index in the transverse direction (x-direction). In some embodiments, the second width ($w_s$) of the strip layer 103 is defined to support a single mode of light propagation through the strip-loaded optical waveguide 100, 100A, 100B. In some embodiments, the second width ($w_s$) of the strip layer 103 is defined to support a plurality of modes of light propagation through the strip-loaded optical waveguide 100, 100A, 100B. In some embodiments, the second width ($w_s$) of the strip layer 103 is within a range extending from about 0.5 micrometer to about 100 micrometers. In some embodiments, the vertical thickness ($t_1$) of the slab layer 101 is within a range extending from about 50 nanometers to about 4000 nanometers, and the vertical thickness ($t_2$) of the strip layer 103 is within a range extending from about 20 nanometers to about 2000 nanometers.

In some embodiments, the slab layer 101 is formed of one or more of silicon, germanium, and silicon-germanium alloy, and the strip layer 103 is formed of one or more of silicon nitride, silicon oxynitride, and aluminum nitride. In some embodiments, the cladding region 109 is formed of silicon oxide. In some embodiments, the insulator layer 107 is formed of silicon dioxide or aluminum oxide. In some embodiments, the intermediate layer 105 is formed of a dielectric material.

In some embodiments, the strip-loaded optical waveguide 100, 100A, 100B includes the p-type doped region 701 formed within a first portion of the slab layer 101 on a first side of the strip layer 103 in the transverse direction (x-direction). In these embodiments, the strip-loaded optical waveguide 100, 100A, 100B also includes the first metal contact structure 705 formed through the cladding region 109 and the intermediate layer 105 (when present) to electrically contact the p-type doped region 701. In these embodiments, the strip-loaded optical waveguide 100, 100A, 100B also includes the n-type doped region 703 formed within a second portion of the slab layer 101 on a second side of the strip layer 103 opposite of the first side of the strip layer 103 in the transverse direction (x-direction). In these embodiments, the strip-loaded optical waveguide 100, 100A, 100B also includes the second metal contact structure 707 formed through the cladding region 109 and the intermediate layer 105 (when present) to electrically contact the n-type doped region 703. In some embodiments, the first metal contact structure 705 and the second metal contact structure 707 are electrically connected to apply a voltage potential across a portion of the slab layer 101 extending between the p-type doped region 701 and the n-type doped region 703.

In some embodiments, the p-type doped region 701 is a first p-type doped region 801 configured to extend along a length of the strip-loaded optical waveguide 100, 100A, 100B as measured in the light propagation direction (z-direction) through the strip-loaded optical waveguide 100, 100A, 100B. Also, the n-type doped region 703 is a first n-type doped region 803 configured to extend along the length of the strip-loaded optical waveguide 100, 100A, 100B as measured in the light propagation direction (z-direction) through the strip-loaded optical waveguide 100, 100A, 100B. The strip-loaded optical waveguide 100, 100A, 100B also includes the series of p-type doped regions 805 formed within the slab layer 101. Each p-type doped region 805 of the series of p-type doped regions 805 extends in the transverse direction (x-direction) below the strip layer 103 from the first p-type doped region 801 toward the first n-type doped region 803. Adjacent p-type doped regions 805 within the series of p-type doped regions 805 are spaced apart from each other in the light propagation direction (z-direction) through the strip-loaded optical waveguide 100, 100A, 100B. In these embodiments, the strip-loaded optical waveguide 100, 100A, 100B also includes the series of n-type doped regions 807 formed within the slab layer 101. Each n-type doped region 807 of the series of n-type doped regions 807 extends in the transverse direction (x-direction) below the strip layer 103 from the first n-type doped region 803 toward the first p-type doped region 801. Each n-type doped region 807 of the series of n-type doped regions 807 is positioned between a respective pair of adjacently positioned p-type doped regions 805 of the series of p-type doped regions 805.

In some embodiments, each of the series of n-type doped regions 807 is spaced apart from both the first p-type doped region 801 and the series of p-type doped regions 805 to form one or more PIN junction diodes. In some embodiments, each of the series of p-type doped regions 805 is spaced apart from both the first n-type doped region 803 and the series of n-type doped regions 807 to form one or more PIN junction diodes. In some embodiments, each of the series of n-type doped regions 807 interfaces with one or more of the first p-type doped region 801 and the series of p-type doped regions 805 to form one or more PN junction diodes. In some embodiments, each of the series of p-type doped regions 805 interfaces with one or more of the first n-type doped region 803 and the series of n-type doped regions 807 to form one or more PN junction diodes.

FIG. 10 shows a flowchart of a method for manufacturing the strip-loaded optical waveguide 100, 100A, 100B, in accordance with some embodiments. The method includes an operation 1001 for disposing the strip layer 103 over the slab layer 101. The strip layer 103 has the width ($w_s$) measured in the transverse direction (x-direction) that is perpendicular to the light propagation direction (z-direction) through the strip-loaded optical waveguide 100, 100A, 100B. The slab layer 101 has a width measured in the transverse direction (x-direction), such that the width ($w_s$) of the strip layer 103 is less than the width of the slab layer 101. The strip layer 103 has the optical refractive index ($n_2$) that is less than the optical refractive index ($n_1$) of the slab layer 101. The width ($w_s$) of the strip layer 103 is set to maximize a size of a $0^{th}$ order optical mode within the slab layer 101 below the strip layer 103 without substantially exciting a higher order optical mode relative to the $0^{th}$ order optical mode. The method also includes an operation 1003 for disposing the cladding layer 109 over both the slab layer 101 and the strip layer 103. The cladding layer 109 has the optical refractive index ($n_4$) that is less than the optical refractive index ($n_2$) of the strip layer 103.

In some embodiments, the multi-strip-loaded optical waveguide 150, 150A, 150B includes the slab layer 101, a plurality of strips within the multiple strip layer 111, and the cladding region 109. The slab layer 101 has the optical refractive index ($n_1$) and a width measured in the transverse direction (x-direction) that is perpendicular to the light propagation direction (z-direction) through the multi-strip-loaded optical waveguide 150, 150A, 150B. The plurality of strips are disposed within the multiple strip layer 111 above the slab layer 101. Each of the plurality of strips has a strip width measured in the transverse direction (x-direction). Adjacently positioned ones of the plurality of strips are spaced apart from each other by a strip-to-strip distance as measured in the transverse direction (x-direction). Each of the plurality of strips has the optical refractive index ($n_2$) that is less than the optical refractive index ($n_1$) of the slab layer 101. A total distance across the plurality of strips in the transverse direction (x-direction) is less than the width of the slab layer 101. The cladding region 109 is disposed above the slab layer 101, above the plurality of strips, and between adjacently positioned ones of the plurality of strips. The cladding region 109 has the optical refractive index ($n_4$) that is less than the optical refractive index ($n_2$) of the plurality of strips. In some embodiments, the multi-strip-loaded optical waveguide 150, 150A, 150B includes the insulator layer 107, where the slab layer 101 is disposed on the insulator layer 107. The insulator layer 107 has the optical refractive index ($n_5$) that is less than optical refractive index ($n_1$) of the slab layer 101. In some embodiments, the multi-strip-loaded optical waveguide 150, 150A, 150B includes the intermediate layer 105 disposed over the slab layer 101 and below the plurality of strips. The intermediate layer 105 has the optical refractive index ($n_3$) that is less than or equal to the optical refractive index ($n_1$) of the slab layer 101.

In some embodiments, the plurality of strips provide a locally increased effective optical refractive index in the transverse direction (x-direction). In some embodiments, the total distance across the plurality of strips in the transverse direction (x-direction) is defined to support a single mode of light propagation through the multi-strip-loaded optical waveguide 150, 150A, 150B. In some embodiments, the total distance across the plurality of strips in the transverse direction (x-direction) is defined to support a plurality of modes of light propagation through the multi-strip-loaded optical waveguide 150, 150A, 150B.

In some embodiments, the total distance across the plurality of strips in the transverse direction (x-direction) is within a range extending from about 0.5 micrometer to about 100 micrometers. In some embodiments, the strip width ($w_2$) is within a range extending from about 100 nanometers to about 1000 nanometers. In some embodiments, the strip width ($w_2$) is substantially the same for each of the plurality of strips. In some embodiments, the strip width ($w_2$) is different for at least two of the plurality of strips. In some embodiments, the strip-to-strip distance (i.e., the spacing between adjacently positioned strips as measured in the transverse (x) direction) is within a range extending from about 100 nanometers to about 1000 nanometers. In some embodiments, the strip-to-strip distance is substantially the same between each adjacent pair of strips within the plurality of strips. In some embodiments, the strip-to-strip distance is different between at least two different adjacent pairs of strips within the plurality of strips. In some embodiments, the vertical thickness ($t_1$) of the slab layer 101 is within a range extending from about 50 nanometers to about 4000 nanometers, and the vertical thickness ($t_2$) of each of the plurality of strips is within a range extending from about 20 nanometers to about 2000 nanometers.

In some embodiments, the slab layer 101 is formed of one or more of silicon, germanium, and silicon-germanium alloy, and each of the plurality of strips is formed of one or more of silicon nitride, silicon oxynitride, and aluminum nitride. In some embodiments, the cladding region 109 is formed of silicon oxide. In some embodiments, the insulator layer 107 is formed of silicon dioxide or aluminum oxide. In some embodiments, the intermediate layer 105 is formed of a dielectric material.

In some embodiments, the multi-strip-loaded optical waveguide 150, 150A, 150B includes the p-type doped region 721 formed within a first portion of the slab layer 101 on a first side of the plurality of strips in the transverse direction (x-direction). Also, the first metal contact structure 725 is formed through the cladding region 109 and the intermediate layer 105 (when present) to electrically contact the p-type doped region 721. Also, the n-type doped region 723 is formed within a second portion of the slab layer 101 on a second side of the plurality of strips opposite of the first side of the plurality of strips in the transverse direction (x-direction). Also, a second metal contact structure 727 is formed through the cladding region 109 and the intermediate layer 105 (when present) to electrically contact the n-type doped region 723. In some embodiments, the first metal contact structure 725 and the second metal contact structure 727 are electrically connected to apply a voltage potential across a portion of the slab layer 101 extending between the p-type doped region 721 and the n-type doped region 723.

In some embodiments, the p-type doped region 721 is a first p-type doped region 901 configured to extend along a length of the multi-strip-loaded optical waveguide 150, 150A, 150B as measured in the light propagation direction (z-direction) through the multi-strip-loaded optical waveguide 150, 150A, 150B. Also, the n-type doped region 723 is a first n-type doped region 903 configured to extend along the length of the multi-strip-loaded optical waveguide 150, 150A, 150B as measured in the light propagation direction (z-direction) through the multi-strip-loaded optical waveguide 150, 150A, 150B. Also, the multi-strip-loaded optical waveguide 150, 150A, 150B includes the series of p-type doped regions 905 formed within the slab layer 101. Each p-type doped region 905 of the series of p-type doped regions 905 extends in the transverse direction (x-direction) below the plurality of strips from the first p-type doped region 901 toward the first n-type doped region 903. Adjacent p-type doped regions 905 within the series of p-type doped regions 905 are spaced apart from each other in the light propagation direction (z-direction) through the multi-strip-loaded optical waveguide 150, 150A, 150B. Also, the multi-strip-loaded optical waveguide 150, 150A, 150B includes the series of n-type doped regions 907 formed within the slab layer 101. Each n-type doped region 907 of the series of n-type doped regions 907 extend in the transverse direction (x-direction) below the plurality of strips from the first n-type doped region 903 toward the first p-type doped region 901. Each n-type doped region 907 of the series of n-type doped regions 907 is positioned between a respective pair of adjacently positioned p-type doped regions 905 of the series of p-type doped regions 905.

In some embodiments, each of the series of n-type doped regions 907 is spaced apart from both the first p-type doped region 901 and the series of p-type doped regions 905 to form one or more PIN junction diodes. In some embodiments, each of the series of p-type doped regions 905 is spaced apart from both the first n-type doped region 903 and the series of n-type doped regions 907 to form one or more PIN junction diodes. In some embodiments, each of the series of n-type doped regions 907 interfaces with one or more of the first p-type doped region 901 and the series of p-type doped regions 905 to form one or more PN junction diodes. In some embodiments, each of the series of p-type doped regions 905 interfaces with one or more of the first n-type doped region 903 and the series of n-type doped regions 907 to form one or more PN junction diodes.

FIG. 11 shows a flowchart of a method for manufacturing the multi-strip-loaded optical waveguide 150, 150A, 150B, in accordance with some embodiments. The method includes an operation 1101 for disposing a plurality of strips over the slab layer 101. Each of the plurality of strips has the strip width measured in the transverse direction (x-direction) that is perpendicular to the light propagation direction (z-direction) through the multi-strip-loaded optical waveguide 150, 150A, 150B. Adjacently positioned ones of the plurality of strips are spaced apart from each other by the strip-to-strip distance as measured in the transverse direction (x-direction). Each of the plurality of strips has the optical refractive index ($n_2$) that is less than the optical refractive index ($n_1$) of the slab layer 101. The total distance across the plurality of strips in the transverse direction (x-direction) is less than the width of the slab layer 101 as measured in the transverse direction (x-direction). The total distance across the plurality of strips in the transverse direction (x-direction) is set to maximize a size of a $0^{th}$ order optical mode within the slab layer 101 below the plurality of strips without exciting a higher order optical mode relative to the $0^{th}$ order optical mode. The method also includes an operation 1101 for disposing the cladding layer 109 over the slab layer 101, over the plurality of strips, and between adjacently positioned ones of the plurality of strips. The cladding layer 109 has the optical refractive index ($n_4$) that is less than the optical refractive index ($n_2$) of the plurality of strips.

The foregoing description of the embodiments has been provided for purposes of illustration and description, and is not intended to be exhaustive or limiting. Individual elements or features of a particular embodiment are generally not limited to that particular embodiment, but, where applicable, are interchangeable and can be used in a selected embodiment, even if not specifically shown or described. In this manner, one or more features from one or more embodiments disclosed herein can be combined with one or more features from one or more other embodiments disclosed herein to form another embodiment that is not explicitly disclosed herein, but rather that is implicitly disclosed herein. This other embodiment may also be varied in many ways. Such embodiment variations are not to be regarded as a departure from the disclosure herein, and all such embodiment variations and modifications are intended to be included within the scope of the disclosure provided herein.

Although some method operations may be described in a specific order herein, it should be understood that other housekeeping operations may be performed in between method operations, and/or method operations may be adjusted so that they occur at slightly different times or simultaneously or may be distributed in a system which allows the occurrence of the processing operations at various intervals associated with the processing, as long as the processing of the method operations are performed in a manner that provides for successful implementation of the method.

Although the foregoing embodiments have been described in some detail for purposes of clarity of understanding, it will be apparent that certain changes and modifications can be practiced within the scope of the appended claims. Accordingly, the embodiments disclosed herein are to be considered as illustrative and not restrictive, and are therefore not to be limited to just the details given herein, but may be modified within the scope and equivalents of the appended claims.

What is claimed is:

1. A multi-strip-loaded optical waveguide, comprising:
   a slab layer having a first optical refractive index and a first width measured in a transverse direction that is perpendicular to a light propagation direction through the multi-strip-loaded optical waveguide;
   a plurality of strips disposed within a strip layer above the slab layer, each of the plurality of strips having a strip width measured in the transverse direction, adjacently positioned ones of the plurality of strips spaced apart from each other by a strip-to-strip distance as measured in the transverse direction, each of the plurality of strips having a second optical refractive index that is less than the first optical refractive index of the slab layer, wherein a total distance across the plurality of strips in the transverse direction is less than the first width of the slab layer; and
   a cladding region disposed above the slab layer, above the plurality of strips, and between adjacently positioned ones of the plurality of strips, wherein the cladding region has a third optical refractive index that is less than the second optical refractive index of the plurality of strips.

2. The multi-strip-loaded optical waveguide as recited in claim 1, wherein the plurality of strips provide a locally increased effective optical refractive index in the transverse direction.

3. The multi-strip-loaded optical waveguide as recited in claim 1, wherein the total distance across the plurality of strips in the transverse direction is defined to support a single mode of light propagation through the multi-strip-loaded optical waveguide.

4. The multi-strip-loaded optical waveguide as recited in claim 1, wherein the total distance across the plurality of strips in the transverse direction is defined to support a plurality of modes of light propagation through the multi-strip-loaded optical waveguide.

5. The multi-strip-loaded optical waveguide as recited in claim 1, wherein the total distance across the plurality of strips in the transverse direction is within a range extending from about 0.5 micrometer to about 100 micrometers.

6. The multi-strip-loaded optical waveguide as recited in claim 1, wherein the strip width is within a range extending from about 100 nanometers to about 1000 nanometers.

7. The multi-strip-loaded optical waveguide as recited in claim 6, wherein the strip width is substantially the same for each of the plurality of strips.

8. The multi-strip-loaded optical waveguide as recited in claim 6, wherein the strip width is different for at least two of the plurality of strips.

9. The multi-strip-loaded optical waveguide as recited in claim 1, wherein the strip-to-strip distance is within a range extending from about 100 nanometers to about 1000 nanometers.

10. The multi-strip-loaded optical waveguide as recited in claim 9, wherein the strip-to-strip distance is substantially the same between each adjacent pair of strips within the plurality of strips.

11. The multi-strip-loaded optical waveguide as recited in claim 9, wherein the strip-to-strip distance is different between at least two different adjacent pairs of strips within the plurality of strips.

12. The multi-strip-loaded optical waveguide as recited in claim 1, wherein the slab layer is formed of one or more of silicon, germanium, and silicon-germanium alloy, and wherein each of the plurality of strips is formed of one or more of silicon nitride, silicon oxynitride, and aluminum nitride.

13. The multi-strip-loaded optical waveguide as recited in claim 1, wherein the cladding region is formed of silicon oxide.

14. The multi-strip-loaded optical waveguide as recited in claim 1, wherein a vertical thickness of the slab layer is within a range extending from about 50 nanometers to about 4000 nanometers, and wherein a vertical thickness of each of the plurality of strips is within a range extending from about 20 nanometers to about 2000 nanometers.

15. The multi-strip-loaded optical waveguide as recited in claim 1, further comprising:
an insulator layer, the slab layer disposed on the insulator layer, the insulator layer having a fourth optical refractive index that is less than first optical refractive index of the slab layer.

16. The multi-strip-loaded optical waveguide as recited in claim 15, wherein the insulator layer is formed of silicon dioxide or aluminum oxide.

17. The multi-strip-loaded optical waveguide as recited in claim 1, further comprising:
an intermediate layer disposed over the slab layer and below the plurality of strips, the intermediate layer having a fourth optical refractive index that is less than or equal to the first optical refractive index of the slab layer.

18. The multi-strip-loaded optical waveguide as recited in claim 17, wherein the intermediate layer is formed of a dielectric material.

19. The multi-strip-loaded optical waveguide as recited in claim 18, further comprising:
a p-type doped region formed within a first portion of the slab layer on a first side of the plurality of strips in the transverse direction;
a first metal contact structure formed through the cladding region and the intermediate layer to electrically contact the p-type doped region;
an n-type doped region formed within a second portion of the slab layer on a second side of the plurality of strips opposite of the first side of the plurality of strips in the transverse direction; and
a second metal contact structure formed through the cladding region and the intermediate layer to electrically contact the n-type doped region.

20. The multi-strip-loaded optical waveguide as recited in claim 19, wherein the first metal contact structure and the second metal contact structure are electrically connected to apply a voltage potential across a portion of the slab layer extending between the p-type doped region and the n-type doped region.

21. The multi-strip-loaded optical waveguide as recited in claim 19, wherein the p-type doped region is a first p-type doped region configured to extend along a length of the multi-strip-loaded optical waveguide as measured in the light propagation direction through the multi-strip-loaded optical waveguide, and wherein the n-type doped region is a first n-type doped region configured to extend along the length of the multi-strip-loaded optical waveguide as measured in the light propagation direction through the multi-strip-loaded optical waveguide, the multi-strip-loaded optical waveguide further comprising:
a series of p-type doped regions formed within the slab layer, each p-type doped region of the series of p-type doped regions extending in the transverse direction below the plurality of strips from the first p-type doped region toward the first n-type doped region, wherein adjacent p-type doped regions within the series of p-type doped regions are spaced apart from each other in the light propagation direction through the multi-strip-loaded optical waveguide, and
a series of n-type doped regions formed within the slab layer, each n-type doped region of the series of n-type doped regions extending in the transverse direction below the plurality of strips from the first n-type doped region toward the first p-type doped region, wherein each n-type doped region of the series of n-type doped regions is positioned between a respective pair of adjacently positioned p-type doped regions of the series of p-type doped regions.

22. The multi-strip-loaded optical waveguide as recited in claim 21, wherein each of the series of n-type doped regions is spaced apart from both the first p-type doped region and the series of p-type doped regions to form one or more PIN junction diodes.

23. The multi-strip-loaded optical waveguide as recited in claim 21, wherein each of the series of p-type doped regions is spaced apart from both the first n-type doped region and the series of n-type doped regions to form one or more PIN junction diodes.

24. The multi-strip-loaded optical waveguide as recited in claim 21, wherein each of the series of n-type doped regions interfaces with one or more of the first p-type doped region and the series of p-type doped regions to form one or more PN junction diodes.

25. The multi-strip-loaded optical waveguide as recited in claim 21, wherein each of the series of p-type doped regions interfaces with one or more of the first n-type doped region and the series of n-type doped regions to form one or more PN junction diodes.

26. A method for manufacturing an optical waveguide, comprising:
disposing a plurality of strips over a slab layer, each of the plurality of strips having a strip width measured in a transverse direction that is perpendicular to a light propagation direction through the optical waveguide, adjacently positioned ones of the plurality of strips spaced apart from each other by a strip-to-strip distance as measured in the transverse direction, each of the plurality of strips having a second optical refractive index that is less than a first optical refractive index of the slab layer, wherein a total distance across the plurality of strips in the transverse direction is less than a width of the slab layer as measured in the transverse direction, wherein the total distance across the plurality of strips in the transverse direction is set to maximize a size of a $0^{th}$ order optical mode within the slab layer below the plurality of strips without exciting a higher order optical mode relative to the $0^{th}$ order optical mode; and disposing a cladding layer over the slab layer, over the plurality of strips, and between adjacently positioned ones of the plurality of strips, the cladding layer having an optical refractive index less than the optical refractive index of the plurality of strips.

* * * * *